(12) United States Patent
Harnett

(10) Patent No.: US 8,320,096 B2
(45) Date of Patent: Nov. 27, 2012

(54) SOFT START CLUTCH CONTROLLER

(75) Inventor: Sean O. Harnett, Penfield, NY (US)

(73) Assignee: Global Digital Instruments LLC, Fairport, NY (US)

( * ) Notice: Subject to any disclaimer, the term of this patent is extended or adjusted under 35 U.S.C. 154(b) by 509 days.

(21) Appl. No.: 12/580,929

(22) Filed: Oct. 16, 2009

(65) Prior Publication Data
US 2010/0033890 A1 Feb. 11, 2010

Related U.S. Application Data

(63) Continuation-in-part of application No. 11/741,475, filed on Apr. 27, 2007, now Pat. No. 7,746,619.

(51) Int. Cl.
*H01H 47/00* (2006.01)
(52) U.S. Cl. .................... 361/160; 361/139
(58) Field of Classification Search .............. 361/139, 361/160
See application file for complete search history.

(56) References Cited

U.S. PATENT DOCUMENTS

| | | | |
|---|---|---|---|
| 4,289,222 A | 9/1981 | Esthimer | |
| 4,509,091 A | 4/1985 | Booth | |
| 4,620,261 A | 10/1986 | Thornton | |
| 4,646,896 A | 3/1987 | Hammond et al. | |
| 4,805,751 A | 2/1989 | Ohkumo et al. | |
| 5,083,273 A | 1/1992 | Nishiwaki et al. | |
| 5,094,332 A * | 3/1992 | Wall ............................ | 192/82 T |
| 5,094,333 A | 3/1992 | Mimura | |
| 5,414,627 A | 5/1995 | Wada et al. | |
| 5,628,390 A | 5/1997 | Richardson et al. | |
| 5,920,160 A | 7/1999 | Yamada et al. | |
| 5,993,350 A | 11/1999 | Lawrie et al. | |
| 6,208,498 B1 | 3/2001 | Ueda | |
| 6,226,167 B1 * | 5/2001 | Chmiel ......................... | 361/160 |
| 6,267,189 B1 | 7/2001 | Nielson et al. | |
| 6,318,182 B1 * | 11/2001 | Boardman ..................... | 73/714 |
| 6,547,699 B2 | 4/2003 | Eich et al. | |
| 6,849,027 B2 | 2/2005 | Eich et al. | |
| 8,056,695 B2 | 11/2011 | Silbernagel | |
| 2002/0055415 A1 | 5/2002 | Yoshikawa et al. | |

FOREIGN PATENT DOCUMENTS

| | | |
|---|---|---|
| JP | 61200561 A | 9/1986 |
| JP | 3137452 A | 6/1991 |

OTHER PUBLICATIONS

Author-Unknown, 8-bit Microcontrollers MC68H908LB8—freescale semiconductor, www.freescale.com, Oct. 2003—67 pages.
Components for Drivelines, Basics of Design engineering, http://www.machinedesign.com/BDE/mechanical/bdemech1/mdemech1_1.htm., Jun. 7, 2005—4 pages.
GlobalSpec the Engineering Search Engine, Electric Clutches Specifications, Jun. 7, 2005, http://www.globalspec.com/specifications/speechelpall?name=ElectricClutch&comp=89, 6 pages.

* cited by examiner

*Primary Examiner* — Danny Nguyen
(74) *Attorney, Agent, or Firm* — Stephen B. Salai, Esq.; Brian B. Shaw, Esq.; Harter Secrest & Emery LLP

(57) ABSTRACT

A clutch actuator for an electromechanical clutch having a solenoid actuating coil initially provides power to the solenoid at a high rate by using a high duty cycle pulse with a modulated controller. When the initial engagement of the clutch elements is sensed by a decrease in current, the duty cycle of the pulse width modulator is reduced and thereafter increased in a controlled fashion to accomplish a soft start.

19 Claims, 29 Drawing Sheets

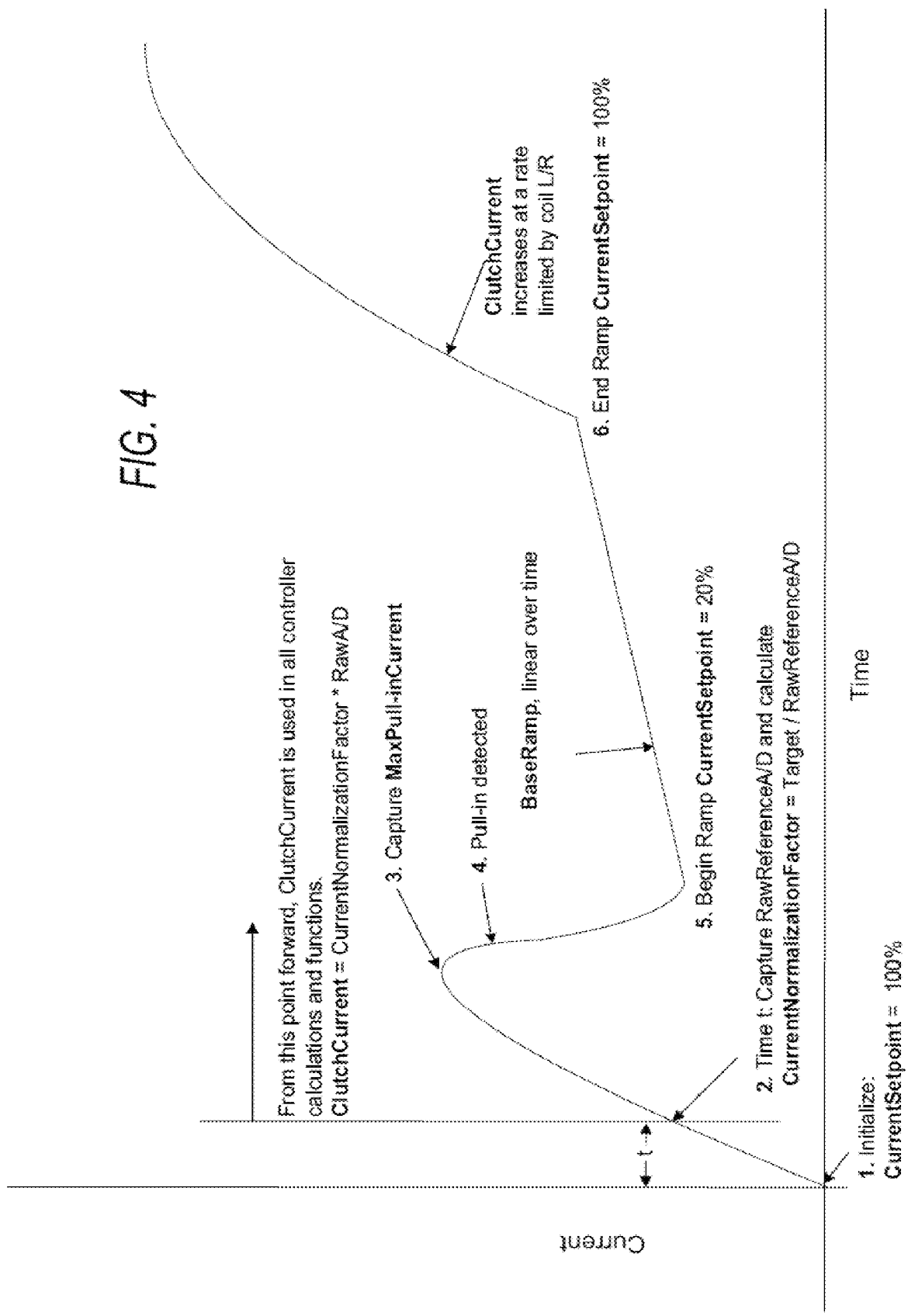

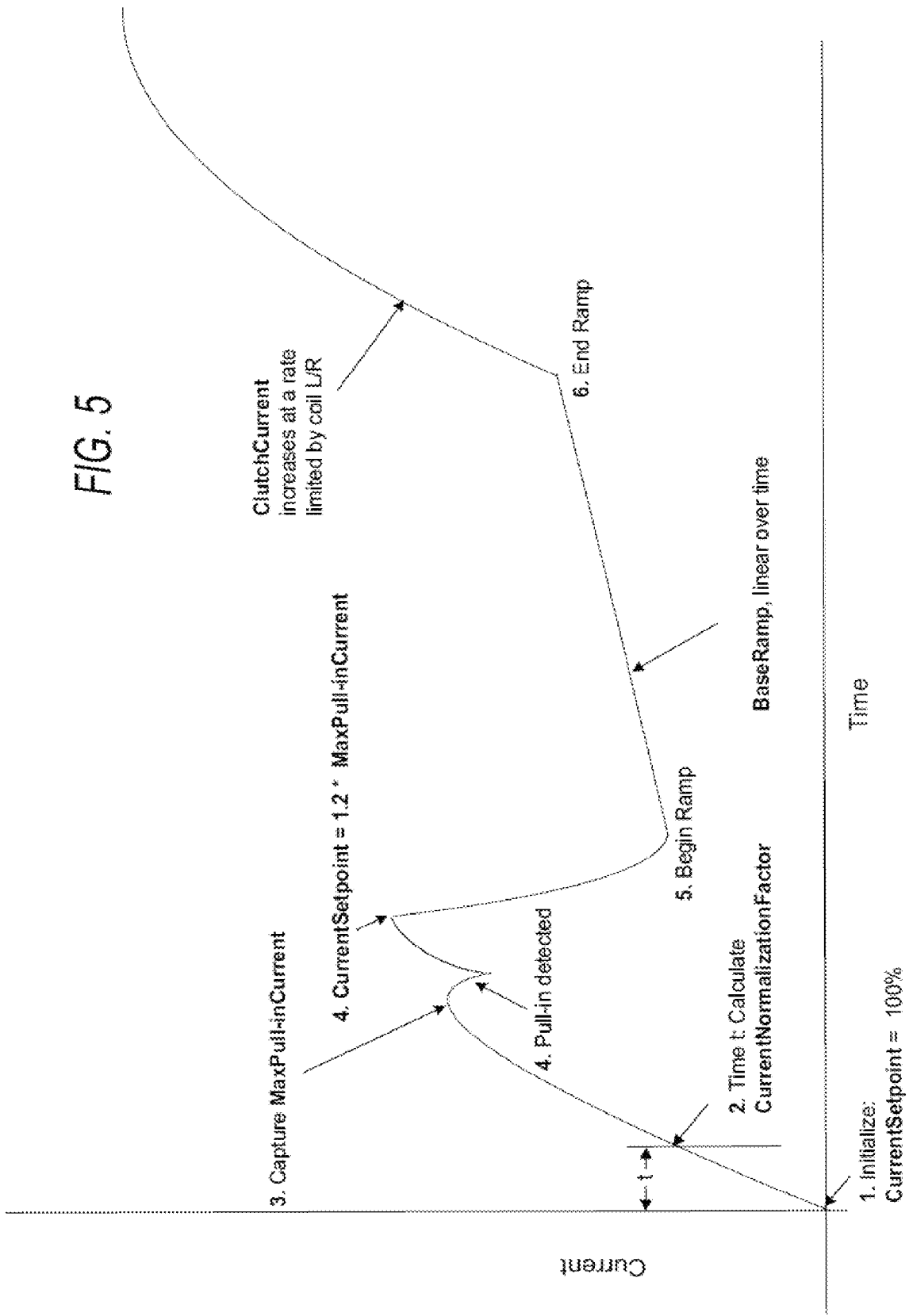

Open loop ramp set for excessively soft engagement.
Ramp start = 80, end = 110

Open loop ramp set for harsh engagement.
Ramp start = 150, end = 200

SOFT START CLUTCH CONTROLLER

CROSS-REFERENCE TO RELATED APPLICATIONS

This application is a continuation-in-part of application Ser. No. 11/741,475 filed Apr. 27, 2007.

STATEMENT REGARDING FEDERALLY SPONSORED RESEARCH OR DEVELOPMENT none

REFERENCE TO A "SEQUENCE LISTING"

Not applicable.

BACKGROUND OF THE INVENTION

1. Field of the Invention

This invention relates generally to the actuation of electromagnetic clutches and more particularly to a controller for such clutches that reduces the stresses associated with engagement of the clutches by providing a progressive or soft start.

2. Description of Related Art

Electromagnetic clutches are used in a variety of applications, including coupling large and small engines and motors to equipment operated by the engines or motors either directly or through transmissions. Especially in the case of relatively small engines and motors, the price of clutch controllers is a significant factor in the implementation of such controllers. However, small engine applications also benefit significantly from controlling the abrupt engagement of clutches since such engagement may increase wear, cause undesirable operating characteristics such as jerking, or cause the engine to stall if the clutch is engaged abruptly.

There have, in the past, been some efforts made towards reducing the abruptness of clutch engagement. Such methods have taken various forms, including mechanical arrangements that suffer from the disadvantage that they are complex and expensive, and electrical arrangements such as a simple switch that have provided less than optimal results. This invention provides a simple and inexpensive method for soft starting an electromagnetic clutch.

In almost all instances, an electromagnetic clutch includes a coil or solenoid through which a current is passed to actuate the clutch, an at least partially ferrous core is arranged to be drawn into the magnetic circuit when current is supplied to the coil. The coil typically resides inside a metal drum directly connected to the engine output shaft. The coil is stationary, but is magnetically coupled to the spinning drum. The armature core usually consists of the clutch disk itself, which is mechanically connected to the output shaft of the clutch assembly and is separated from the driven side by an "air-gap." As current is applied to the coil, the magnetic field of the coil builds as the drum is magnetized to the point where the output disk (armature core) is pulled across the air-gap and contacts the drum face. At this point, the armature core becomes more closely coupled to the magnetic circuit and the inductance of the coil increases significantly.

This invention relies on the characteristic of a solenoid type of clutch actuator that the inductance of a solenoid increases as the core is drawn into the magnetic circuit of the solenoid. Since the core is mechanically connected to the clutch, movement of the core is directly related to the position and therefore the state of the clutch and by taking advantage of this, the present invention permits the position of the clutch to be determined from the increase in the inductance of the coil that occurs as the core is drawn into the magnetic circuit.

Because the current flowing through a coil will tend to increase with time, according to a well-known relationship, the actual current through a coil as a function of time can be predicted relatively accurately. Where the inductance of the coil increases quickly enough as the core moves into the magnetic circuit, the current through the coil will decrease rather than increase as a function of time, and by monitoring the current through the coil and recognizing this decrease in current as the clutch begins to engage, the present invention provides a method and apparatus for controlling the engagement of the clutch to provide a soft start.

If the clutch armature (clutch disc) pulls in squarely toward the electromagnet a distinct drop in current will occur that is easy to detect. However, the current signature may be less distinct if the armature pulls in obliquely or if the armature assembly is vibrating.

Mechanical vibration of the armature can cause a variation of the inductance as the core position in the coil varies at the vibration frequency. This change in inductance will cause a resulting modulation of the current waveform at the vibration frequency. This effect is most pronounced just before the pull-in point as the electromagnet begins to pull the armature closer. This makes pull-in difficult to detect.

The armature may also pull in obliquely especially in the case where a permanent magnet brake is employed. In this case, the edge of the armature opposite the brake magnet typically pulls in first, causing a relatively small change in inductance. The disc may then peel or roll off the permanent magnet causing several more small changes in inductance rather than one large distinct change.

It is desirable to provide a clutch controller that automatically adjusts for different clutch models. Clutches come in many different sizes, larger clutches requiring more current to activate the solenoid than smaller clutches. In prior art controllers, predetermined absolute current set points have been used to control the operation of the clutches. For example, a controller might initiate a ramp at a starting point of 1.2 amps for a three amp clutch, and a starting point of 2 amps for a 5 amp clutch.

Another problem of known controllers is that the current ramp increases the current slowly from a preset value to 100%. In practice, the clutch is fully engaged at a value somewhat less than 100% and continuing the ramp past this value may cause clutch slippage and overheating.

Heretofore, while a speed sensor has been employed to select a predefined current profile, it is preferable to use the actual RPM of the motor as feedback to actively control the current during the ramp up. Doing this allows the input shaft RPM and the output shaft RPM to be used to actively control the slip via the clutch current.

However, the necessary RPM information is typically not available at reasonable cost on motors of the type to which this invention is addressed. This is particularly true with respect to the RPM of the output shaft. Consequently, known prior art controllers have been open loop controllers. That is, the clutch current is modulated with the expectation that the desired engagement profile will result. However, changing load conditions and clutch wear can cause the engagement profile to vary greatly from the desired profile.

Typically, what is most important to the application is that the load is accelerated smoothly and that mechanical stresses and noise are minimized.

While a variety of methods for controlling the current passing through the clutch may suggest themselves to those skilled in the art, and in accordance with the invention, it is preferred to control the current through the use of a pulse width modulator which can be adjusted to provide a controlled amount of current to the coil of the clutch and thereby to accomplish a soft start.

BRIEF SUMMARY OF THE INVENTION

In accordance with a presently preferred embodiment of the invention, current through the coil of a clutch actuator is initially sent to a high value by establishing a high duty or continuous cycle for a pulse width modulated current controller. When a decrease in current through the clutch is sensed, thereby indicating that engagement of the clutch has begun, the duty cycle of the pulse width modulator is reduced quickly to a lower value and thereafter increased in a controlled fashion to accomplish a soft start.

In accordance with an embodiment of this invention that automatically adapts to clutches of different sizes and current ratings, a normalization factor is used to scale the raw current measured by a current sensor such as an A/D converter by a normalization factor so that the clutch current varies by a scaled value between zero and 100% without regard to the actual maximum clutch current. The clutch current used by the controller to set the ramp current and to detect pull-in is described by the following equation:

ClutchCurrent=CurrentNormalizationFactor*RawA/D
where RawA/D is the unscaled, current measured through the solenoid.

The invention contemplates determining the CurrentNormalizationFactor in several different ways. In accordance with one aspect of the invention the CurrentNormalizationFactor is based on RawA/D current measured at time t after the clutch is energized.

In accordance with another embodiment of this invention the CurrentNormalizationFactor is based on RawA/D current measured after the clutch solenoid has reached saturation. Because saturation occurs after the soft start has already occurred, the value is stored in nonvolatile memory for the next soft start.

In accordance with another aspect of this invention, pull-in detection is improved. While defining pull-in as a predefined drop in current below a stored maximum reference current detects pull-in in many instances, the present invention improves detection in those cases where pull-in is not distinct. In accordance with the invention the coil current waveform is sampled for example at 1 ms intervals and the rate of change of current over a predetermined time is calculated. This approximates the derivative of the coil current waveform over time (di/dt) and pull-in is defined to occur when di/dt falls below a Pull-InThreshold. By combining this technique with the detection of a sharp pull-in signature, the onset of pull-in may be reliably determined.

In accordance with another aspect of this invention, a clutch controller is provided having an adaptive pull-in detection threshold. Because the current through a solenoid necessary to pull in a clutch increases with clutch wear, a fixed Pull-in Threshold is not an accurate way to detect actual pull-in. In accordance with this invention, the rate of change of solenoid current with respect to time is compared to a calculated current wave form and the Pull-in Threshold is adjusted to accurately detect pull-in at different magnitudes of clutch current so as to adapt to clutch wear.

In accordance with another aspect of this invention, engine RPM is used to actively control the current supplied to the clutch solenoid. Where the clutch controller is used on a spark ignited internal combustion engine, the ignition pulse period can be used to derive engine RPM. RPM droop provides a simple approximation of the load on the driving motor and is therefore particularly useful in adjusting the clutch engagement profile.

In accordance with another aspect of the invention, the BaseRamp that can be initially defined as derived solely as a percentage of the normal current range is modified over time based on accumulated data from prior clutch engagements. In accordance with one aspect of the invention, the difference between the calculated BaseRamp and the actual BaseRamp at the start and end of the ramp are integrated with previous engagement errors at these points and applied to the BaseRamp starting and ending values, thereby adjusting the BaseRamp slope and offset for the next clutch engagement.

In accordance with another aspect of the invention, if desired, once the clutch is fully engaged, the current through the coil may be reduced to a holding value that is somewhat less than the current required to actuate the clutch, by adjusting the duty cycle of the pulse width modulated control power to a holding value. This feature reduces solenoid coil heat dissipation, thereby enabling the use of a higher power solenoid than would be possible without this adjustment.

In accordance with a further aspect of this invention the condition of a partial pull-in is accommodated by allowing the current to build beyond the detected pull-in point. When the current through the solenoid exhibits a large sharp drop, this indicates that complete pull-in has occurred and little or no additional current build time is needed or desired. When the change in current at pull-in is indistinct, an adaptive Pull-in Threshold (ApiInsuranceThr) is calculated based on the difference between the maximum pull-in current and the minimum current drop after pull-in is detected.

While the novel aspects of the invention are set forth with particularity in the appended claims, the invention itself together with further objects and advantages thereof may be more readily comprehended by reference to the following detailed description thereof taken in conjunction with the accompanying drawing in which:

BRIEF DESCRIPTION OF THE SEVERAL VIEWS OF THE DRAWING(S)

FIG. 4 is a graphical representation of the current flowing through a clutch solenoid in accordance with one aspect of this invention;

FIG. 5 is a graphical representation of the current through a solenoid in accordance with another aspect of this invention;

Figure 6:
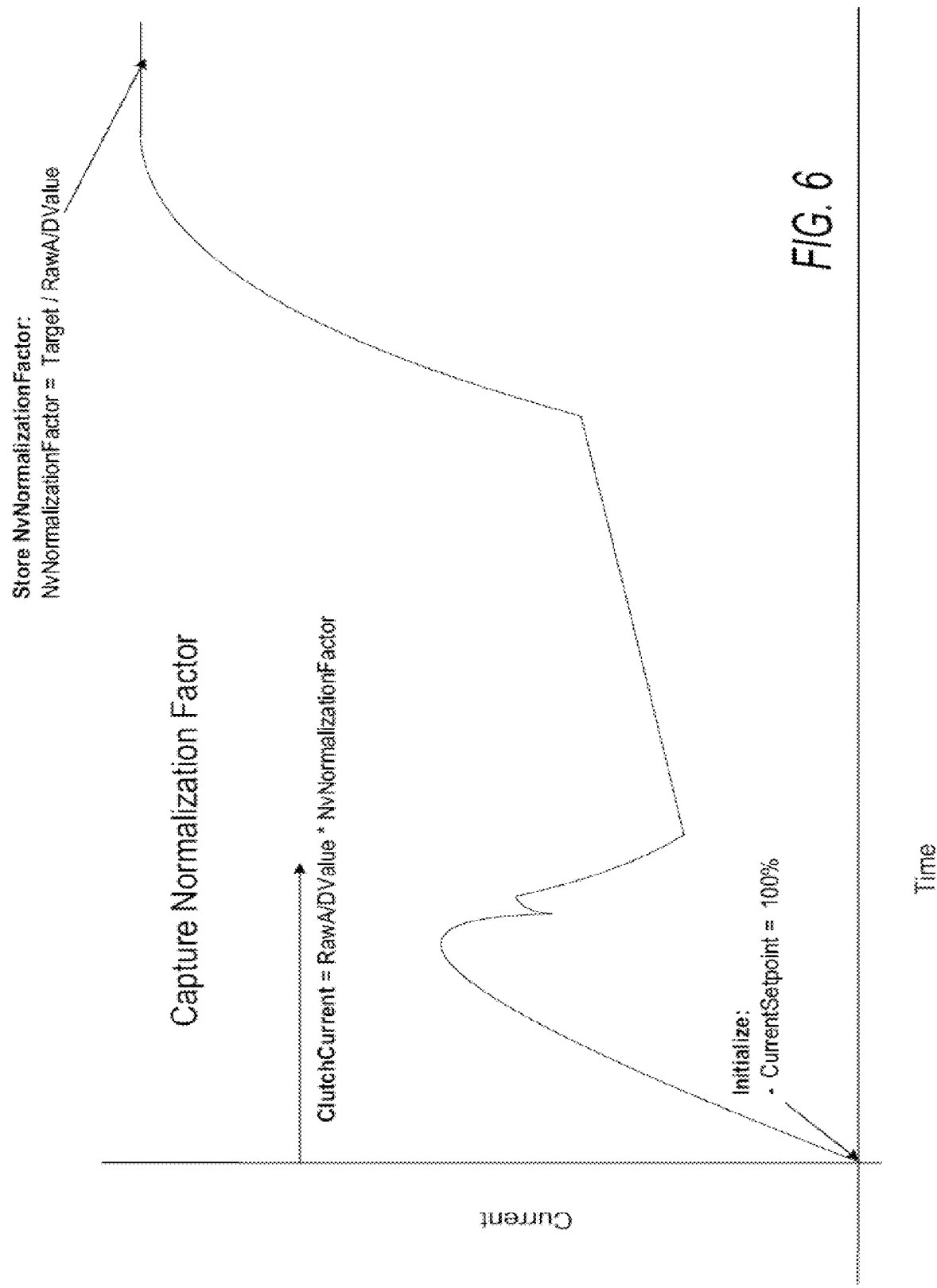
FIG. 6 is a graphical representation of current normalization using the saturation value as a reference.
Figure 7:
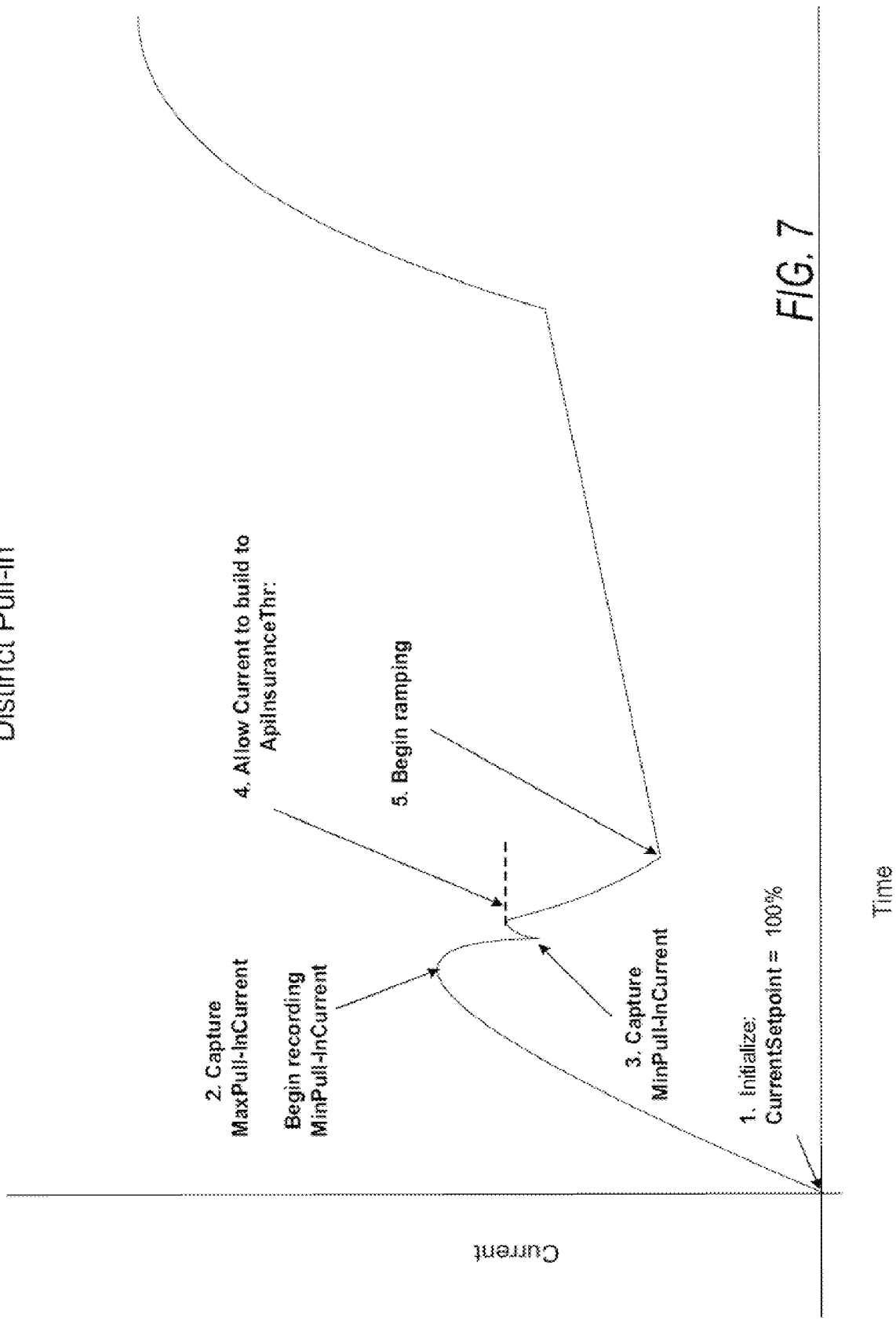
Figure 8:
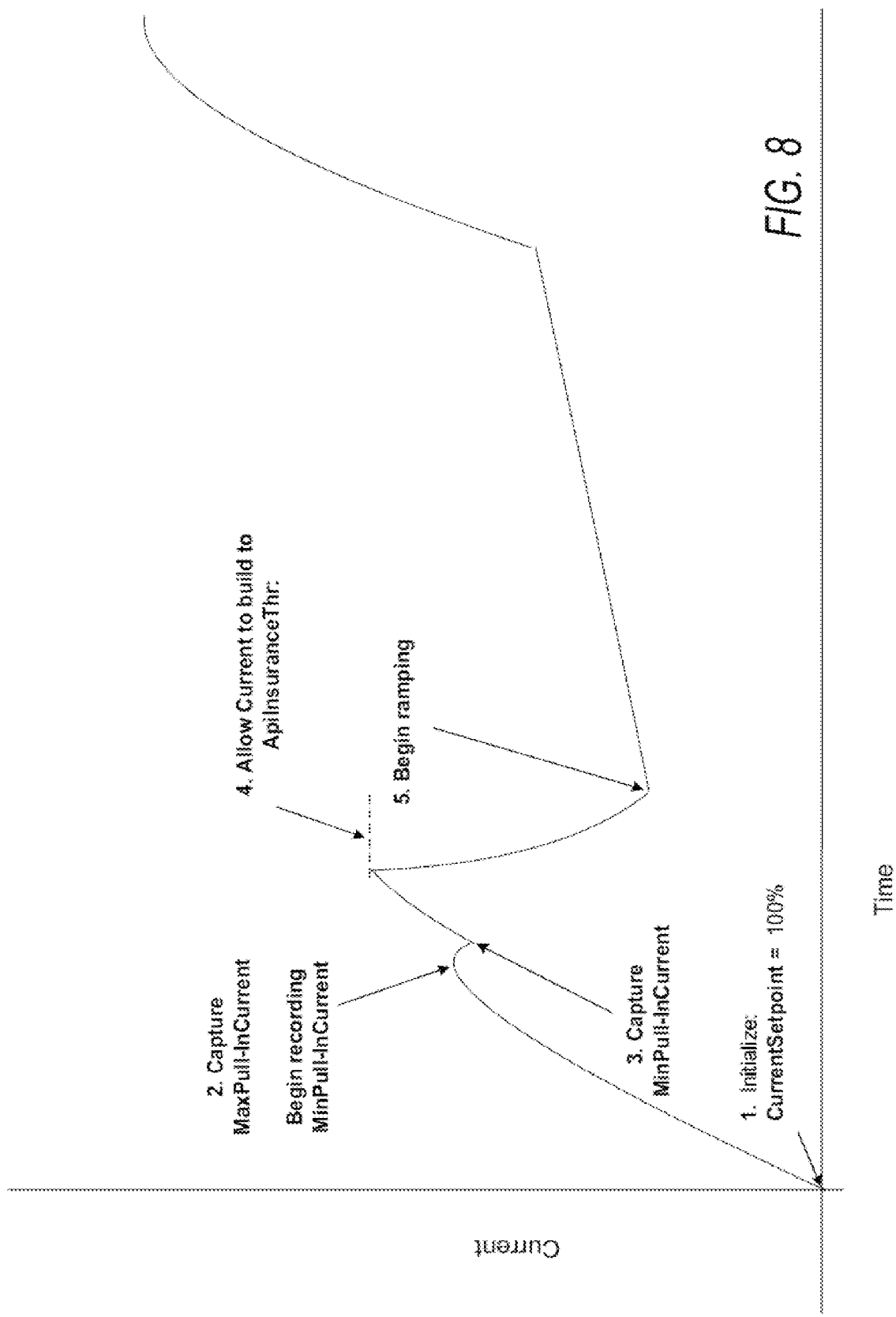
Figure 9:
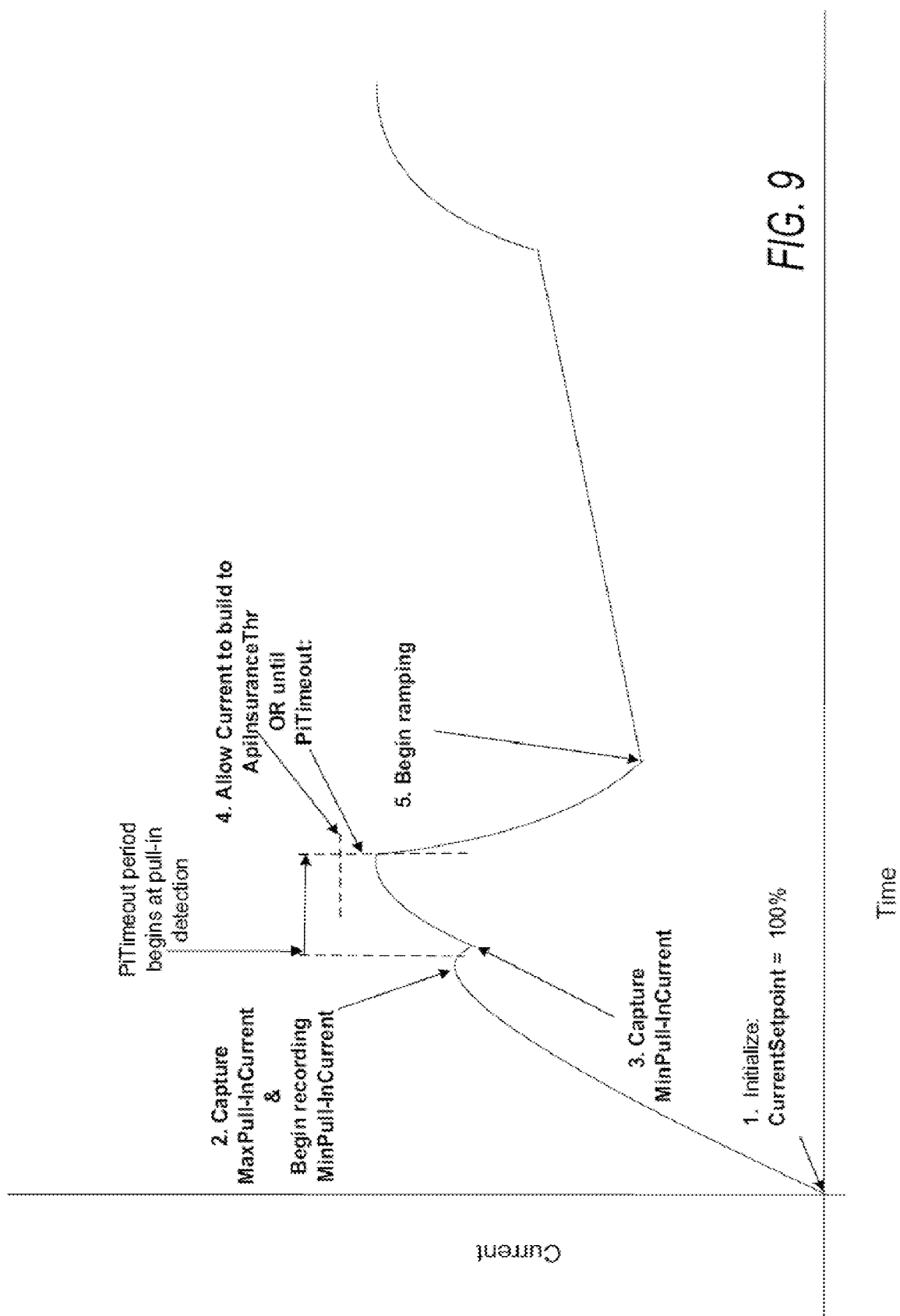
Figure 10:
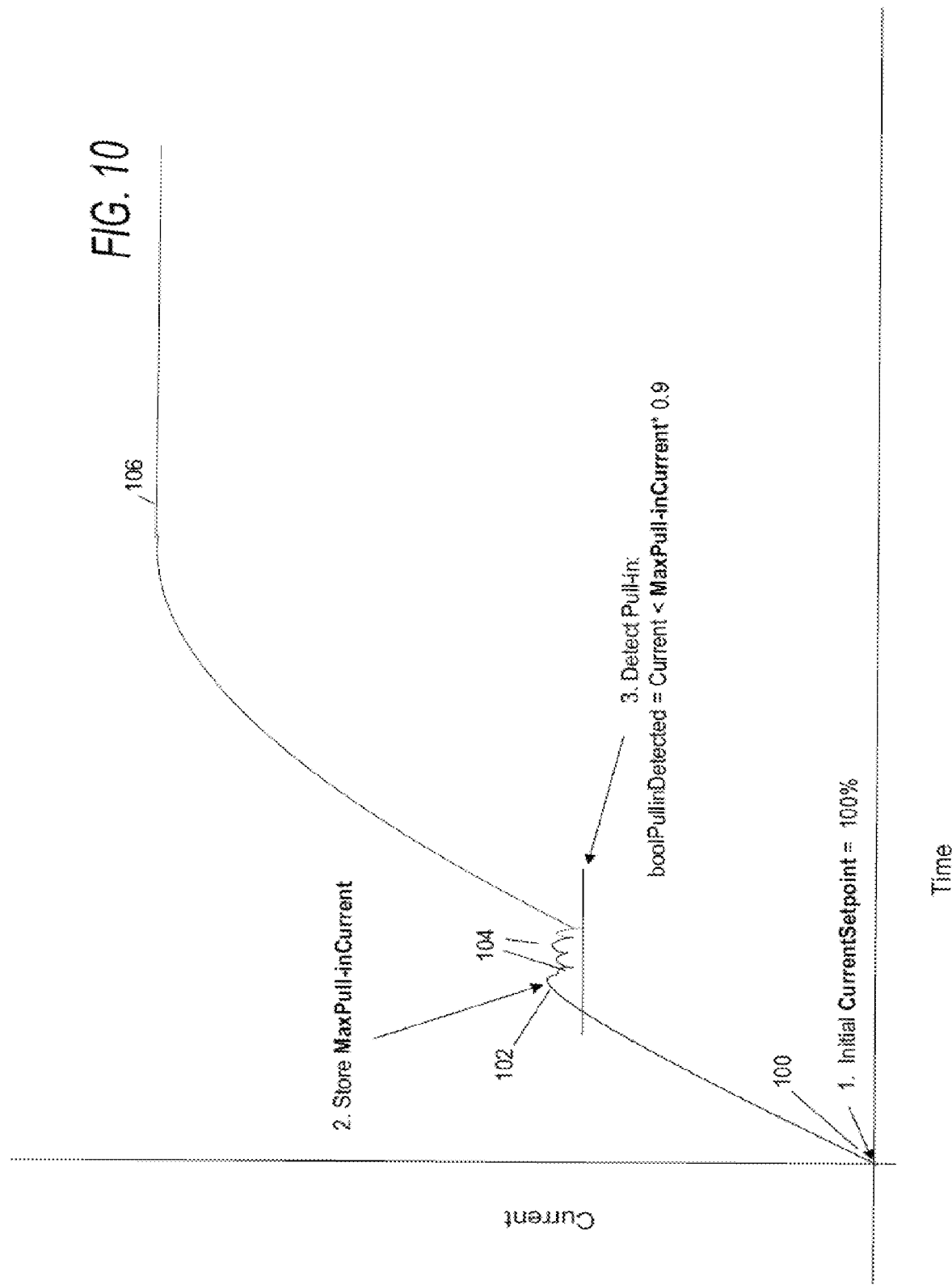
Figure 11:
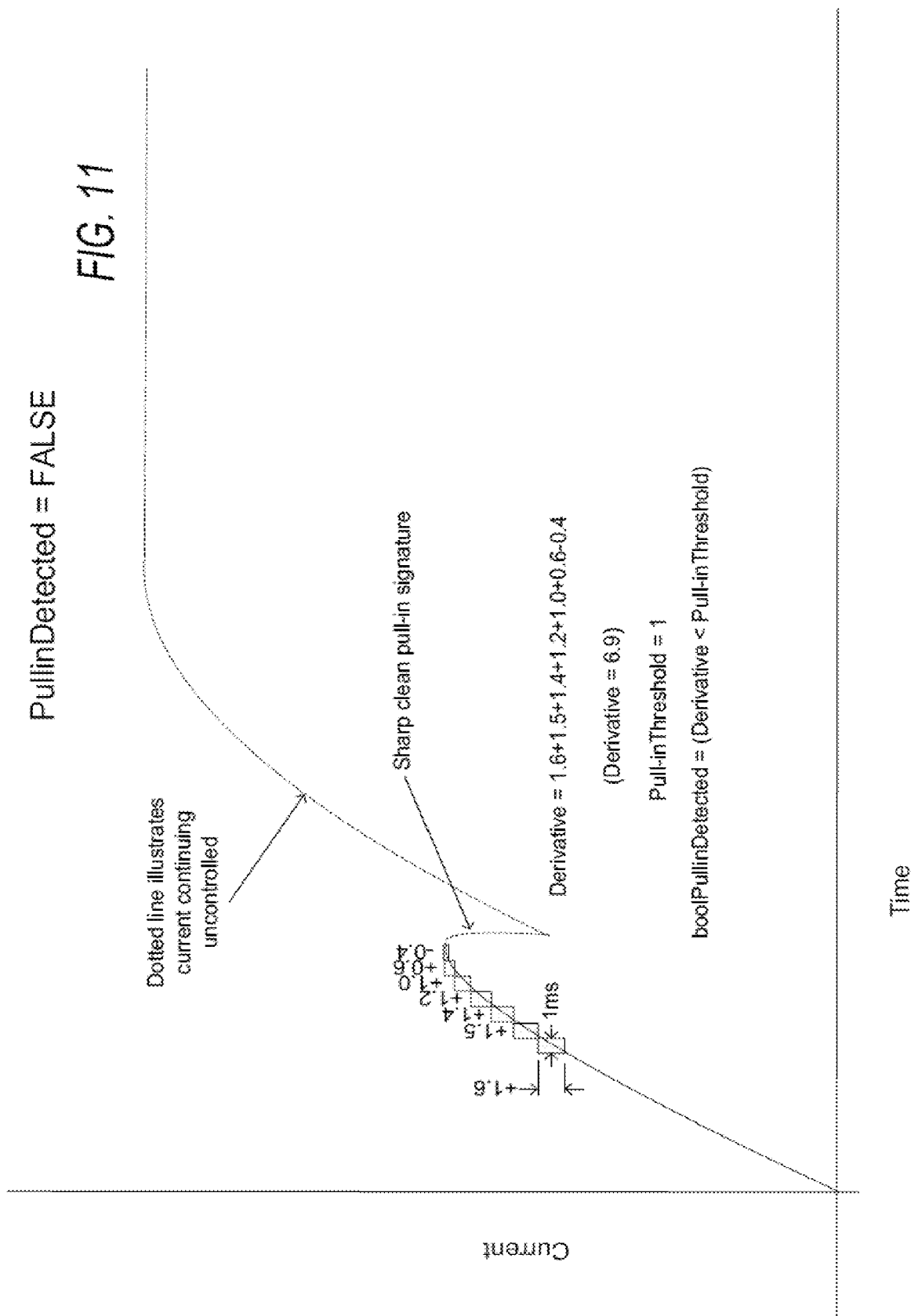
Figure 12:
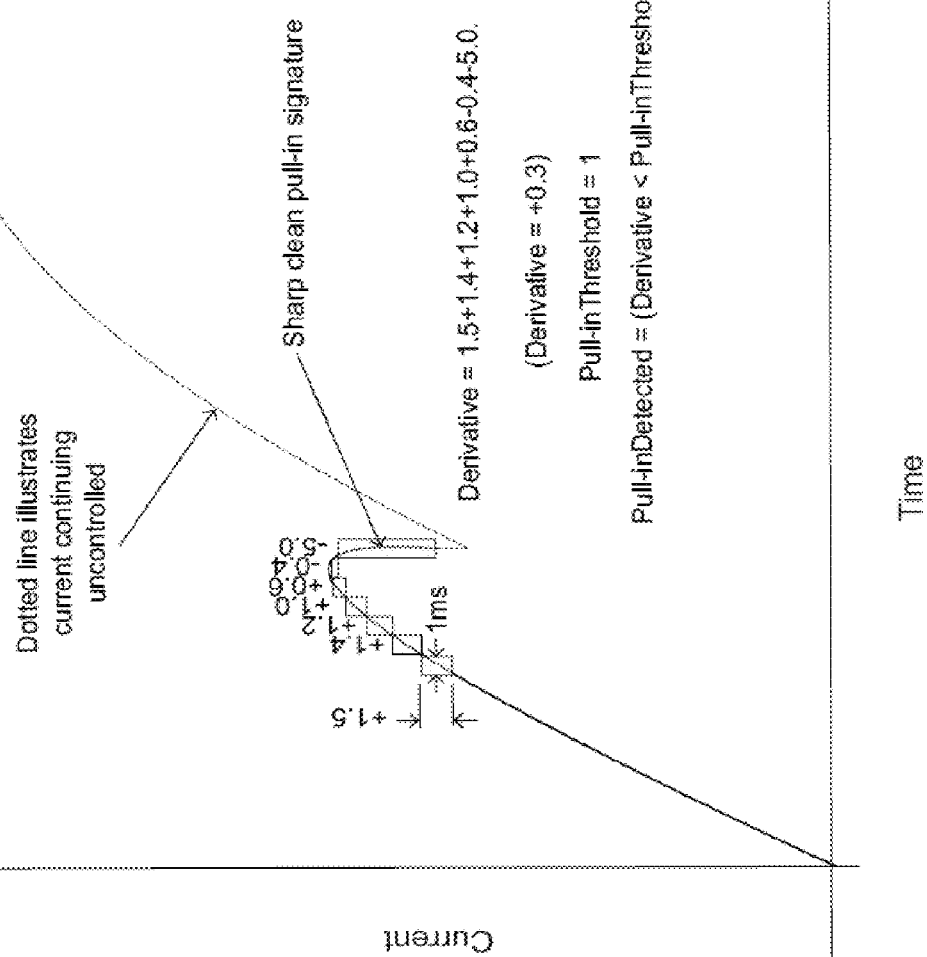
Figure 13:
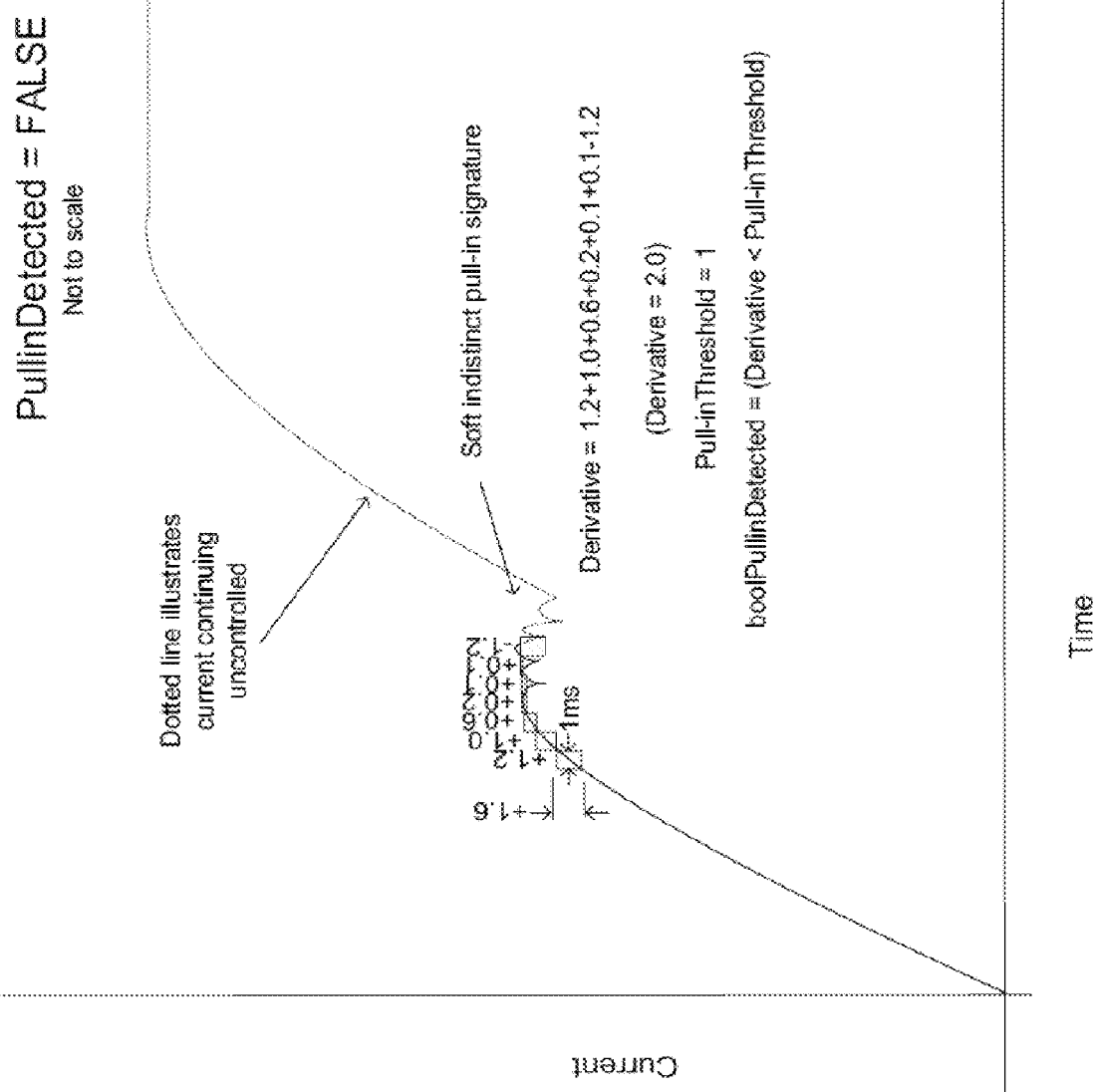
Figure 14:
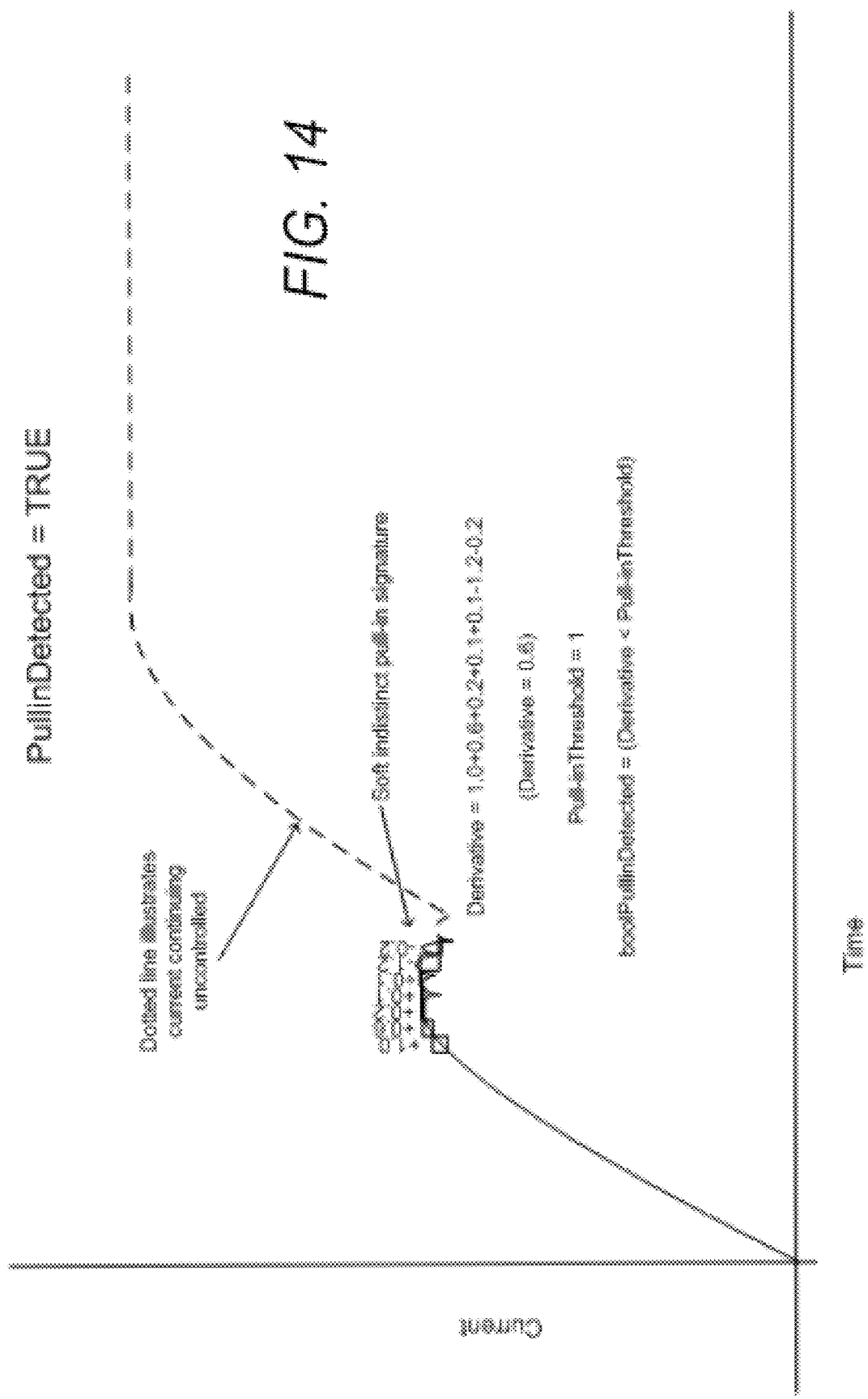
Figure 15:
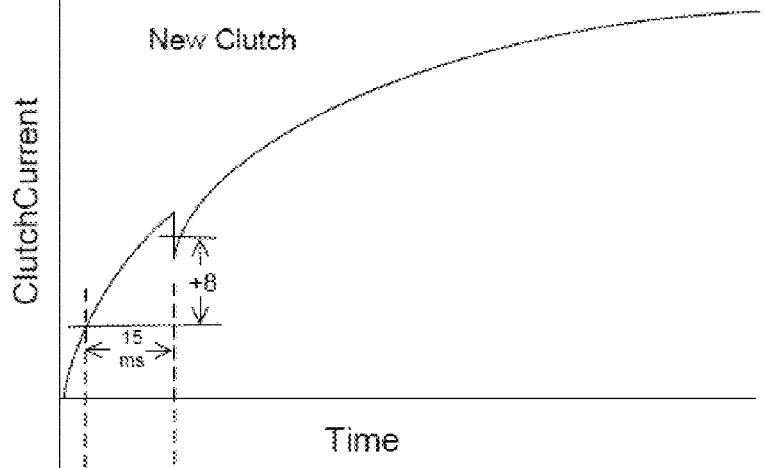
Figure 16:
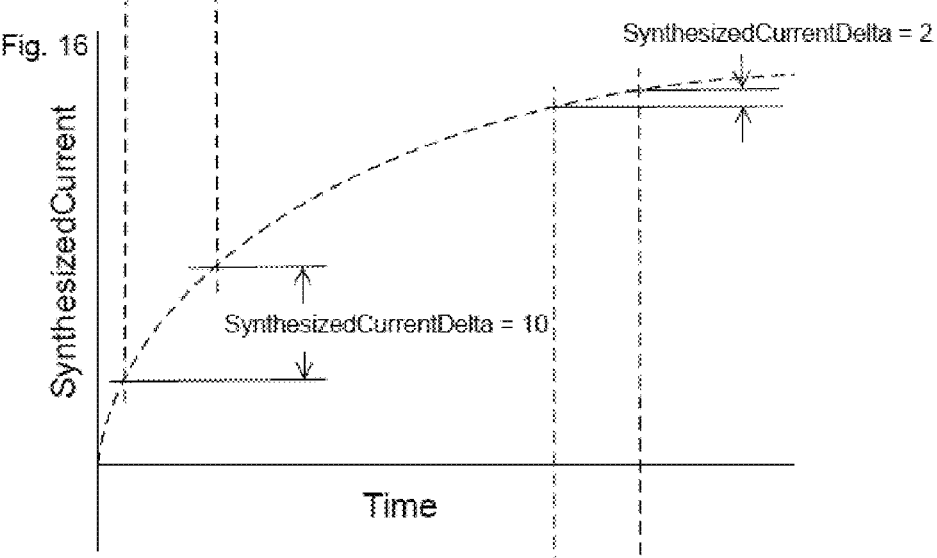
Figure 17:
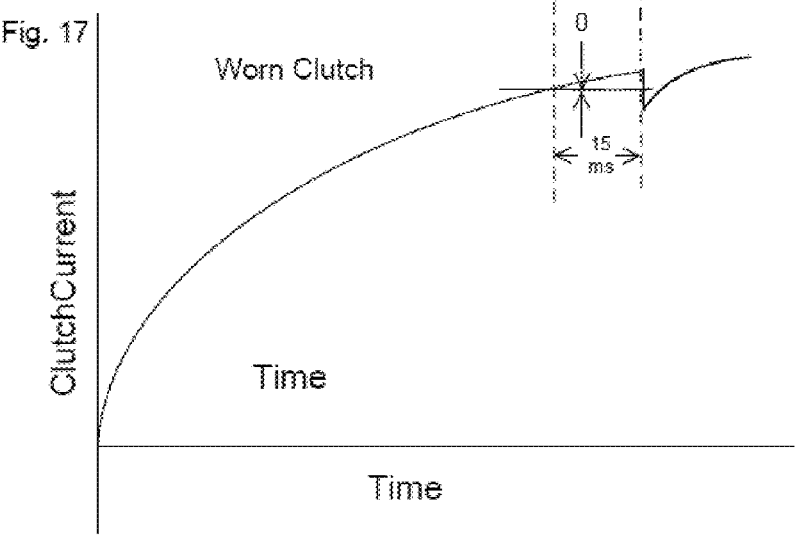
Figure 18:
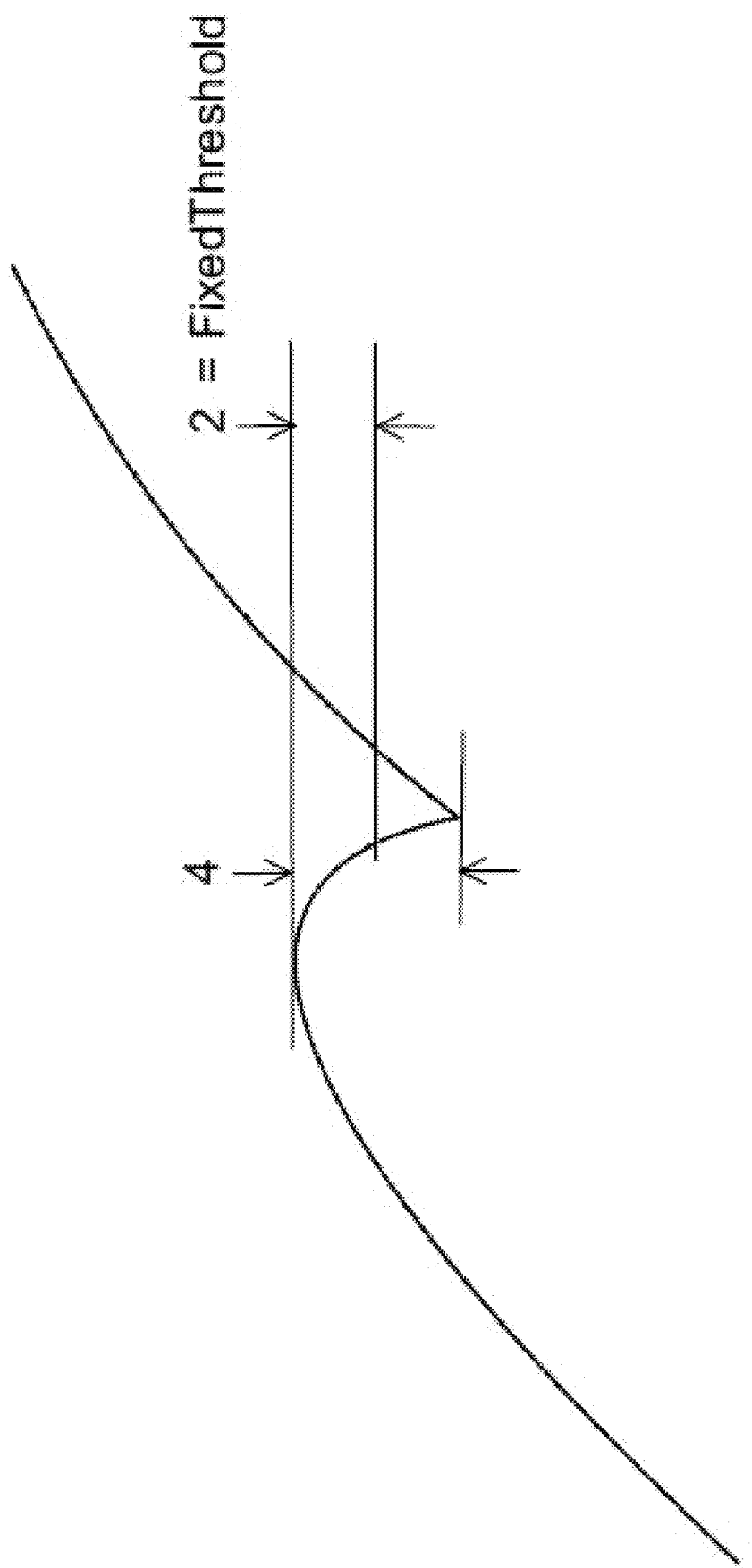
Figure 19:
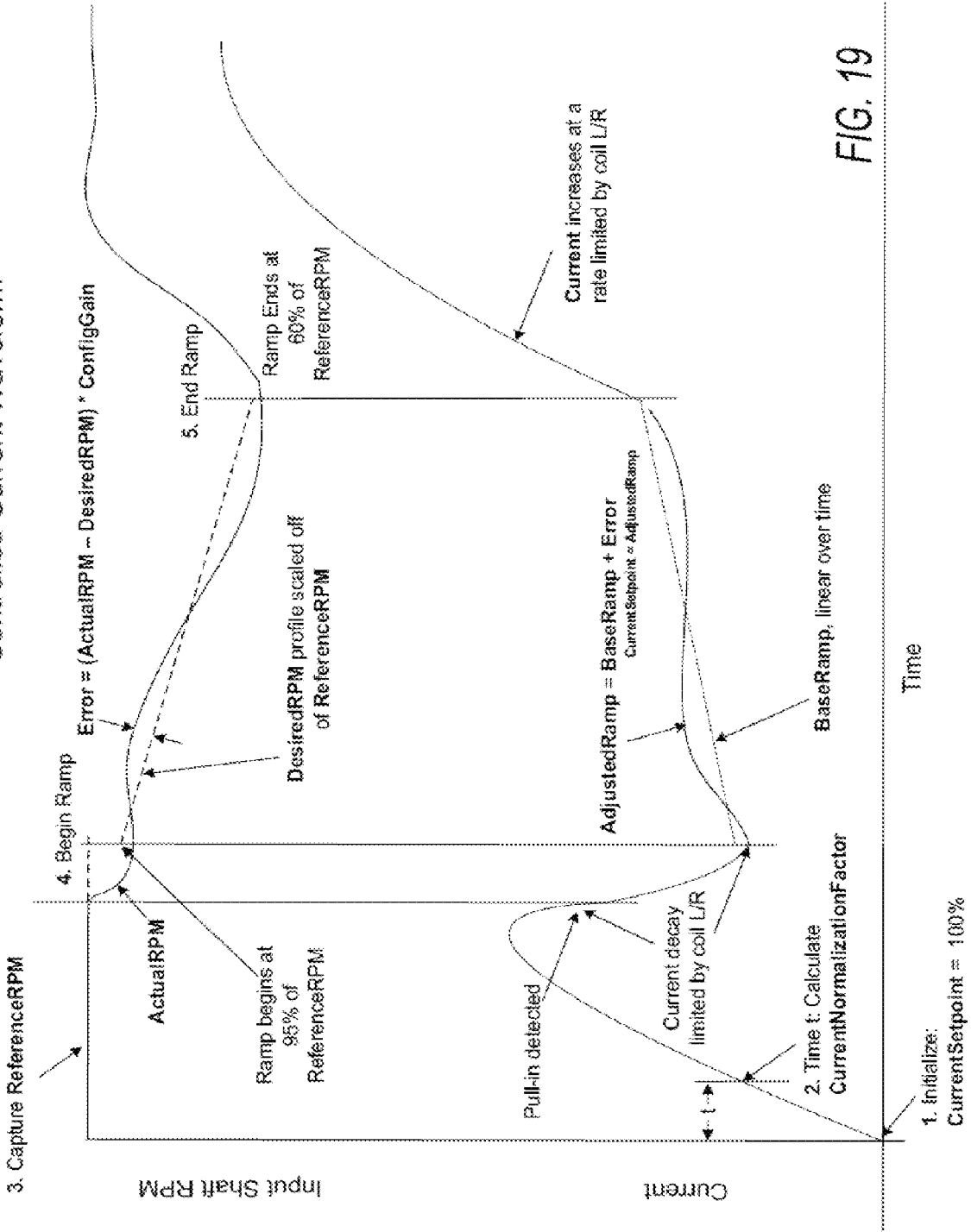
Figure 20:
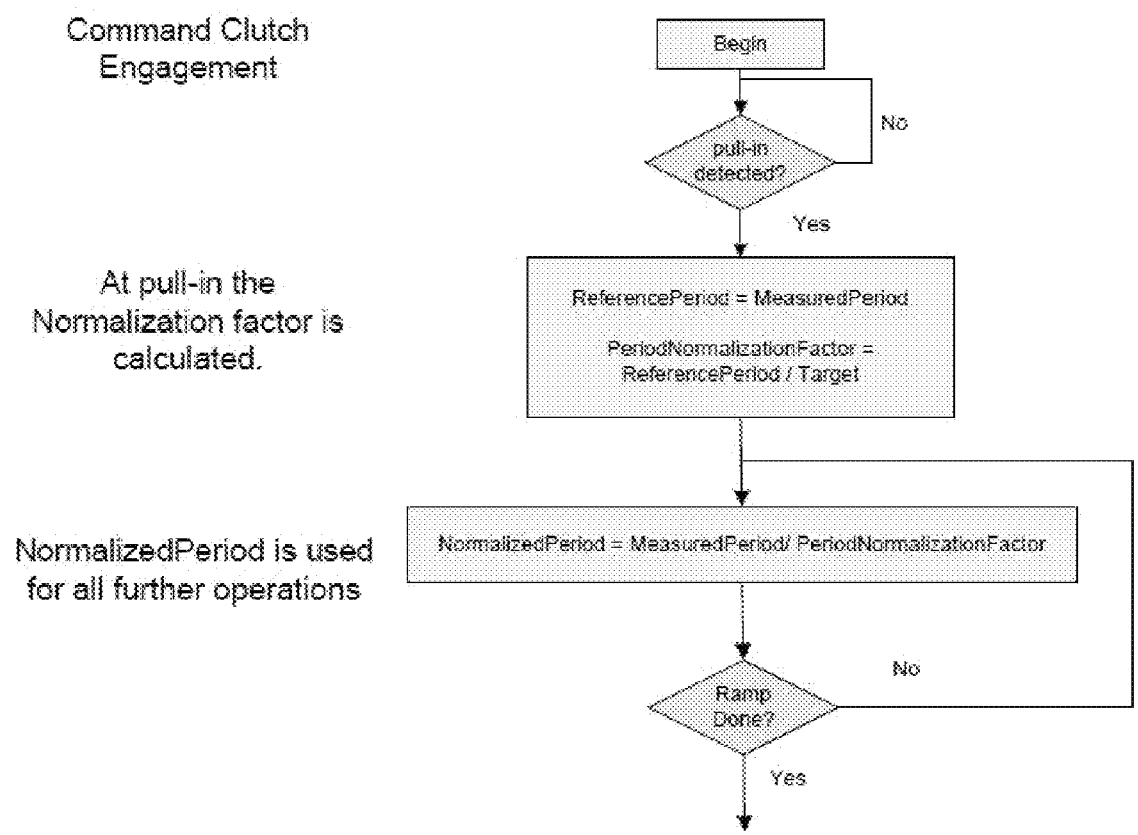
Figure 21:
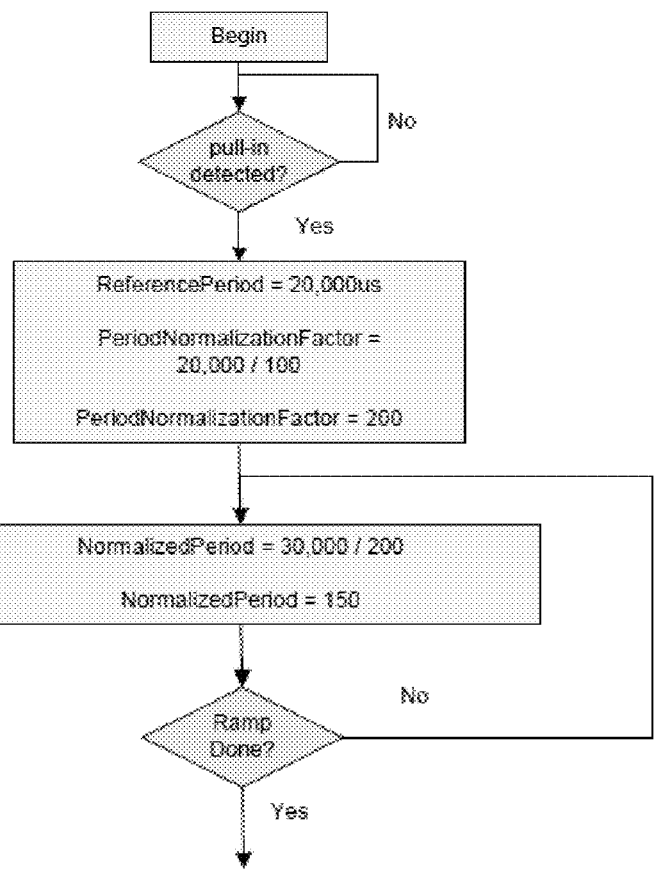
Figure 22:
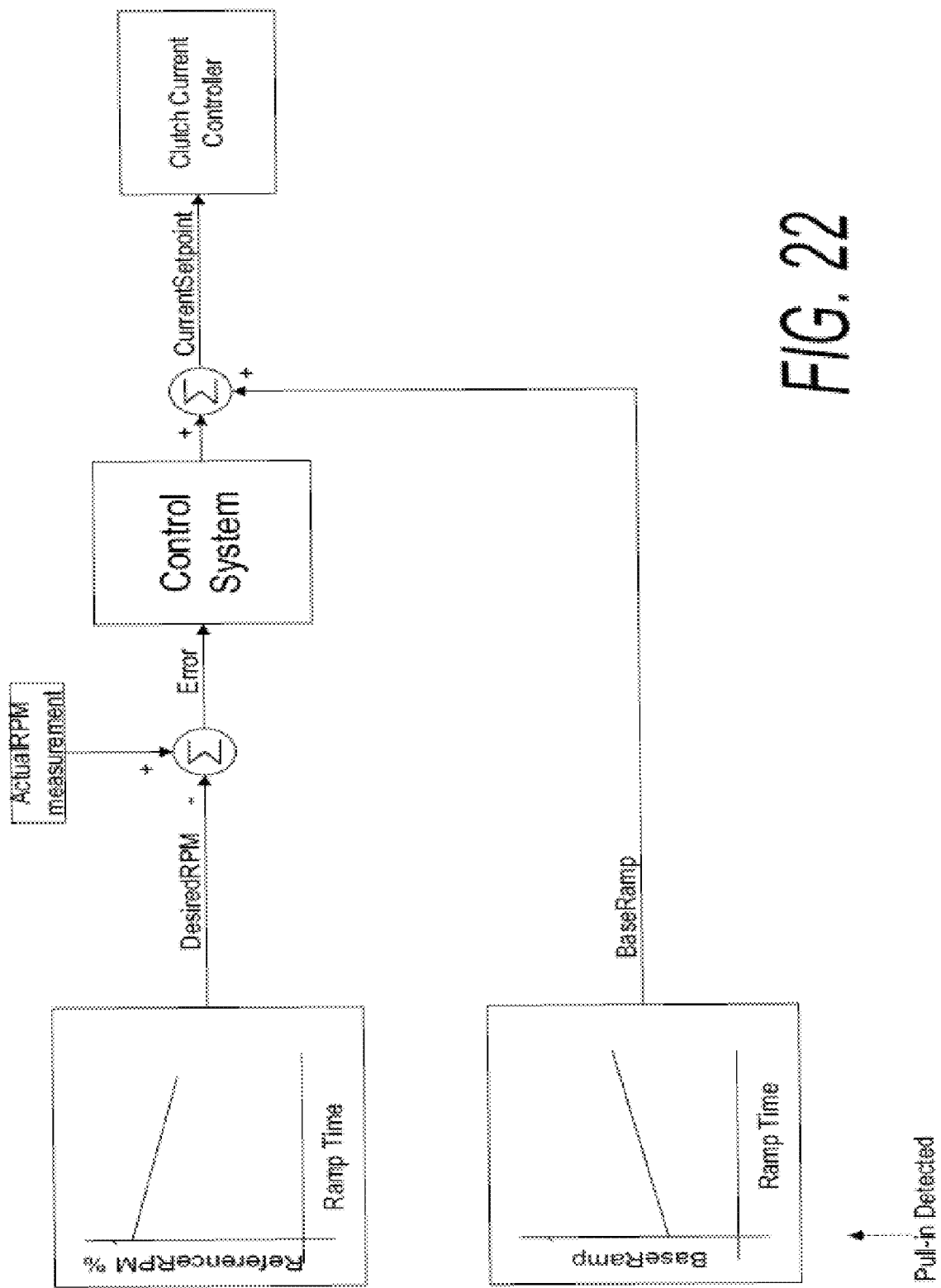
Figure 27:
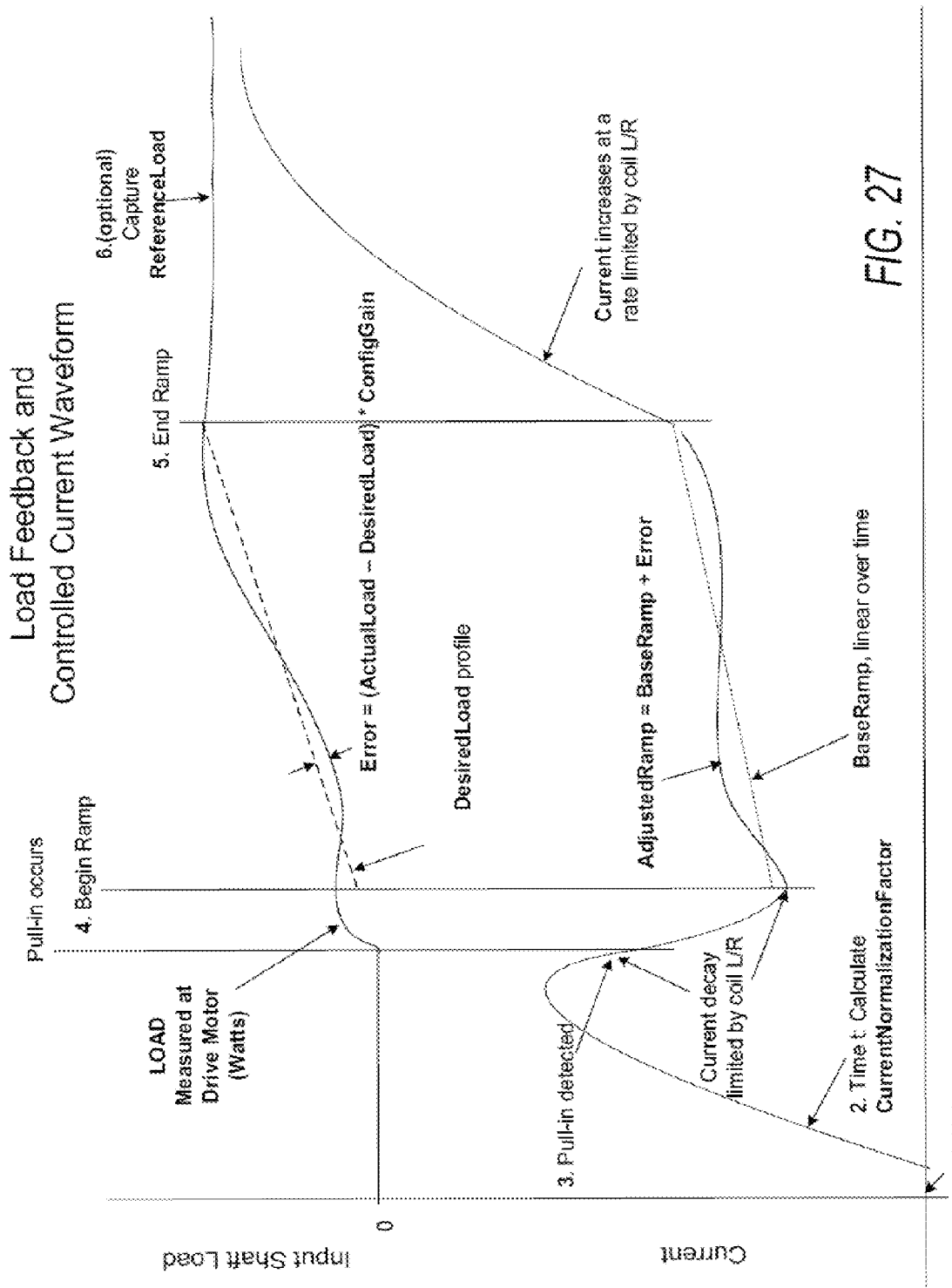
Figure 28:
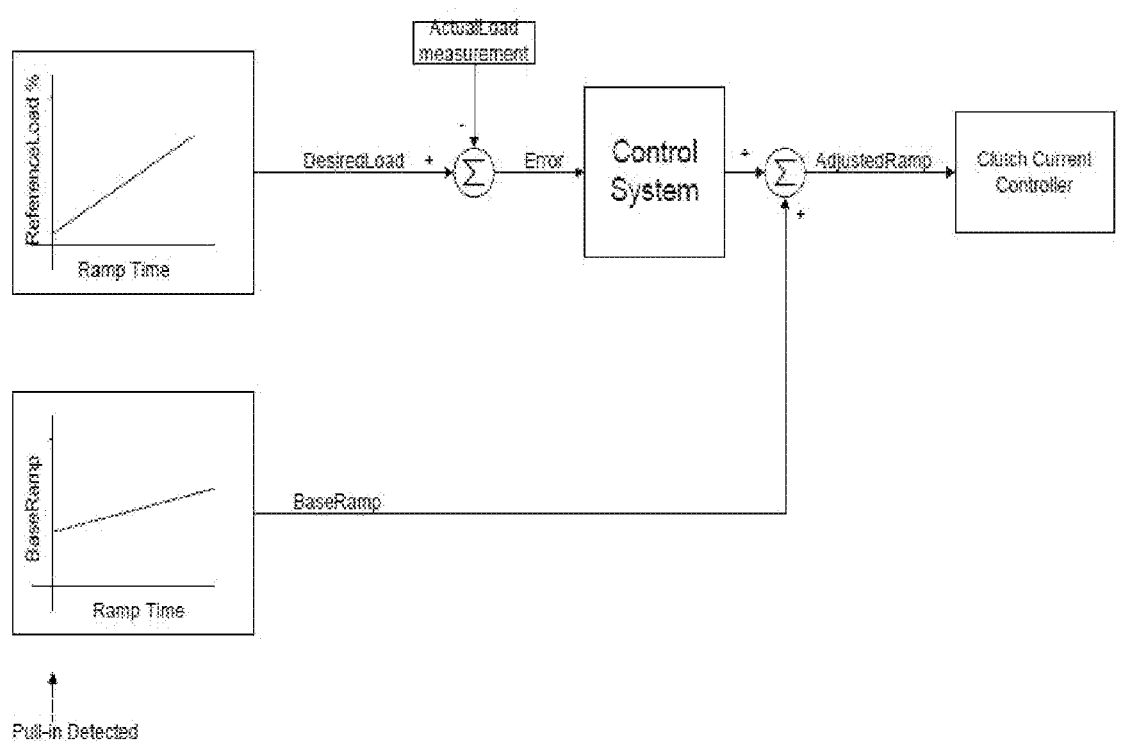
Figure 29:
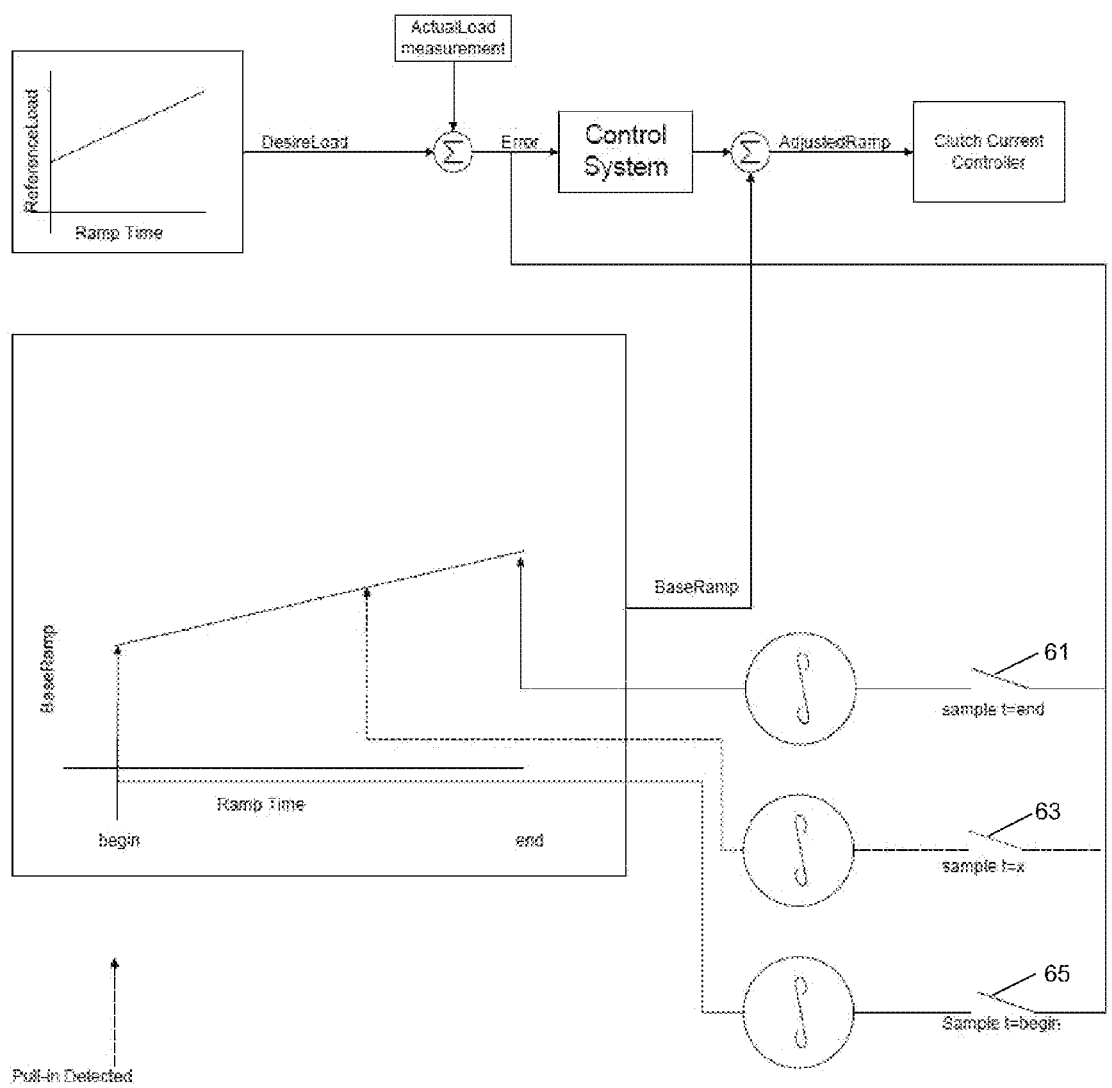
Figure 30:
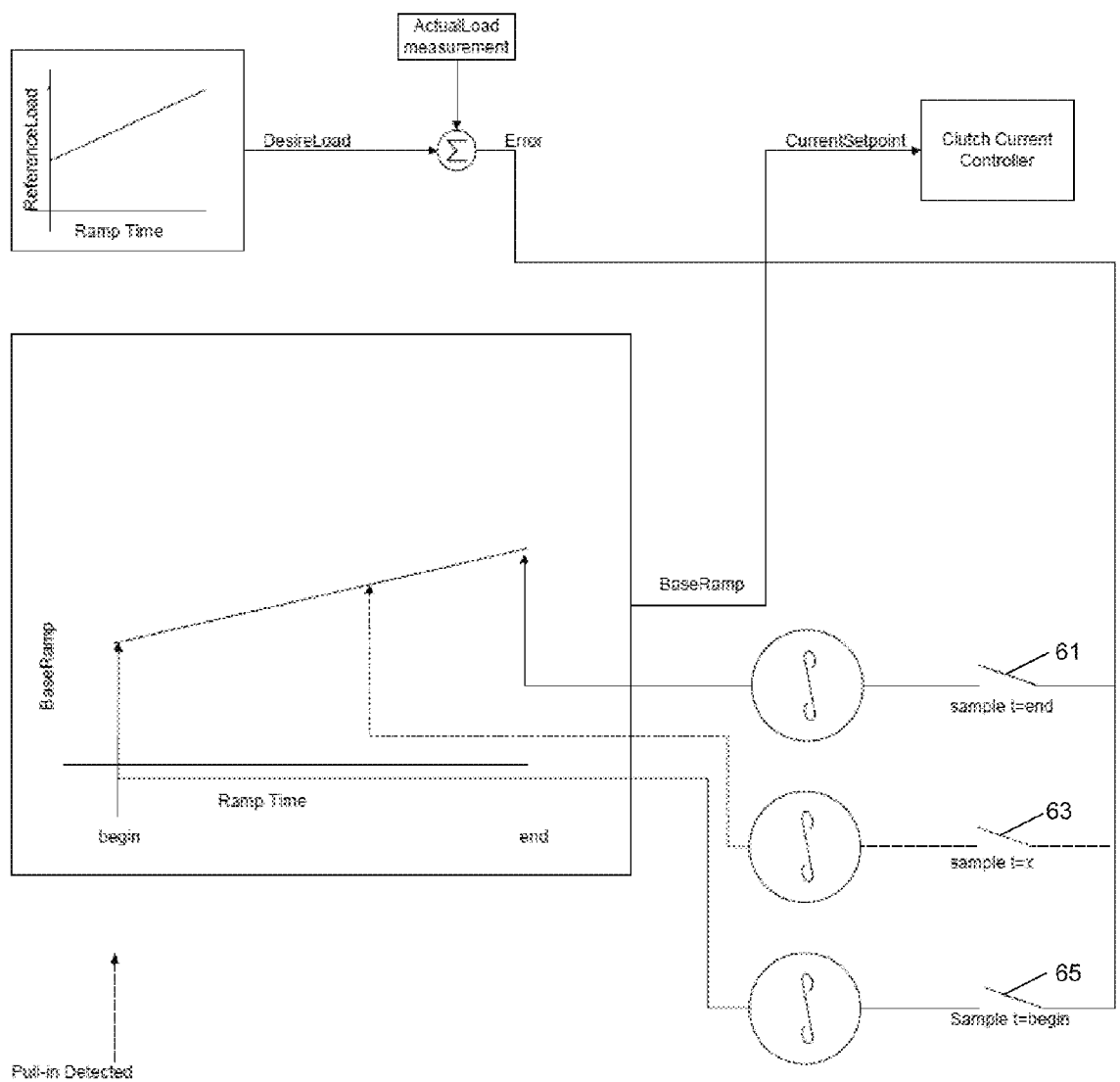
Figure 31:
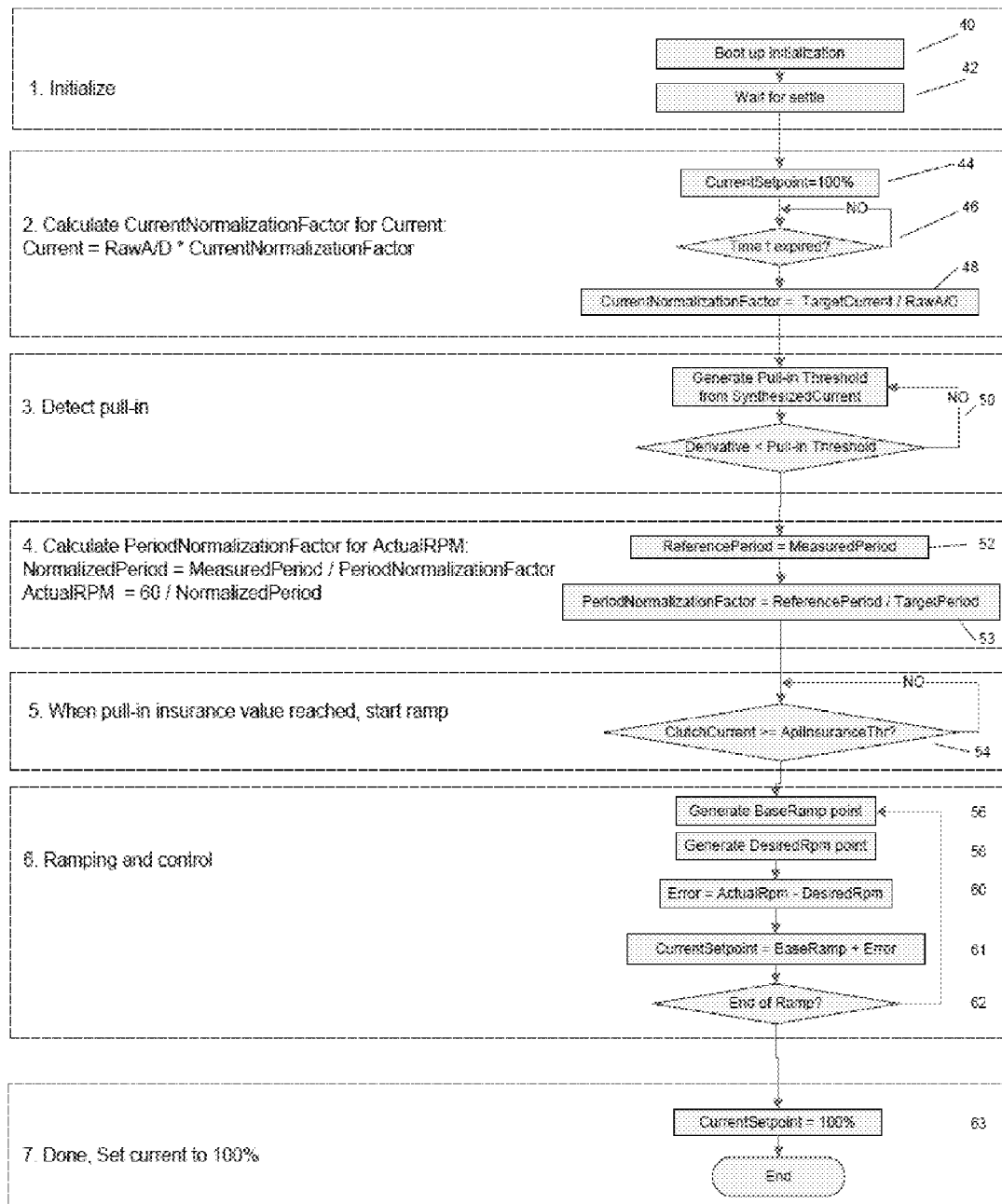
Figure 32:
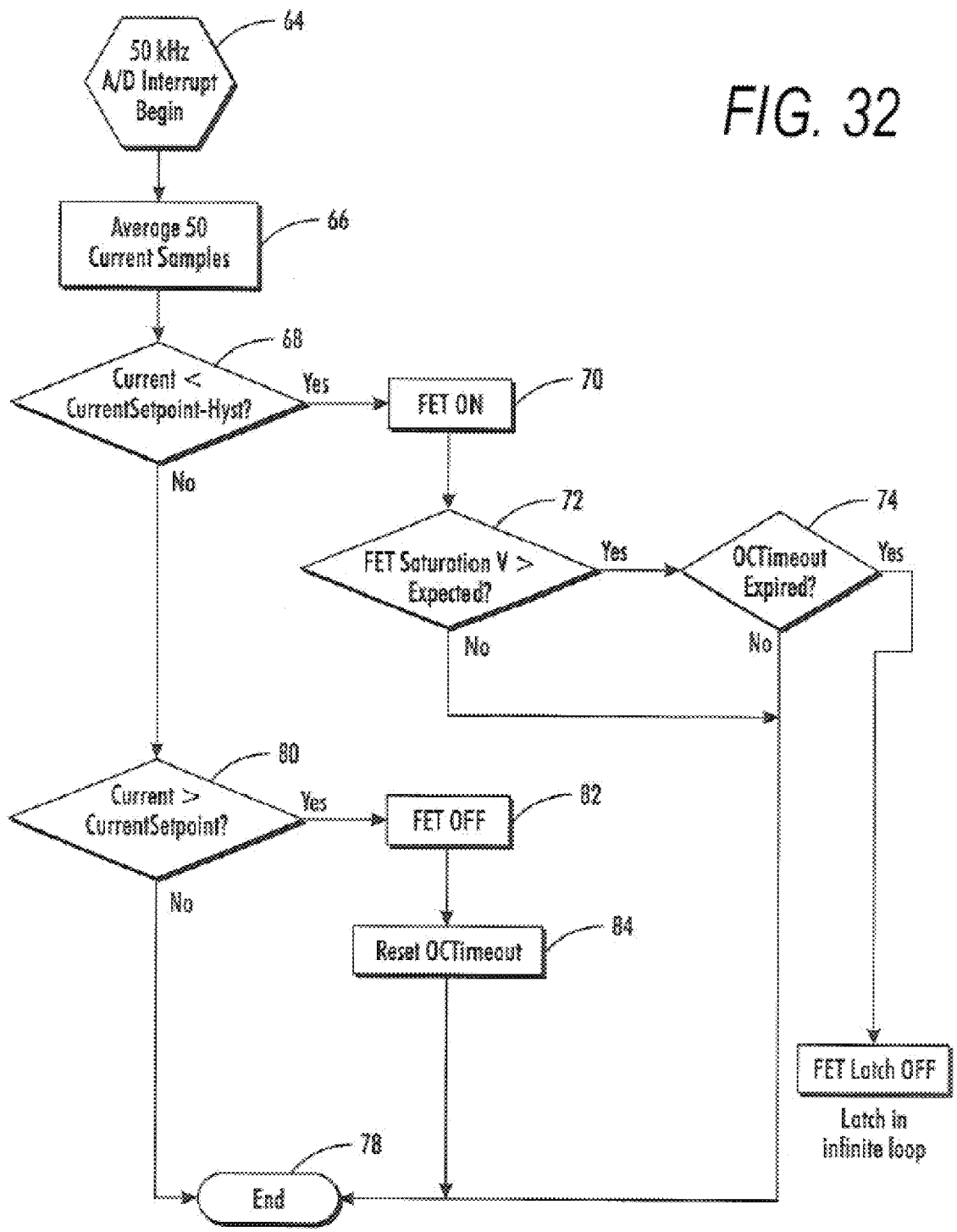
Figure 33:
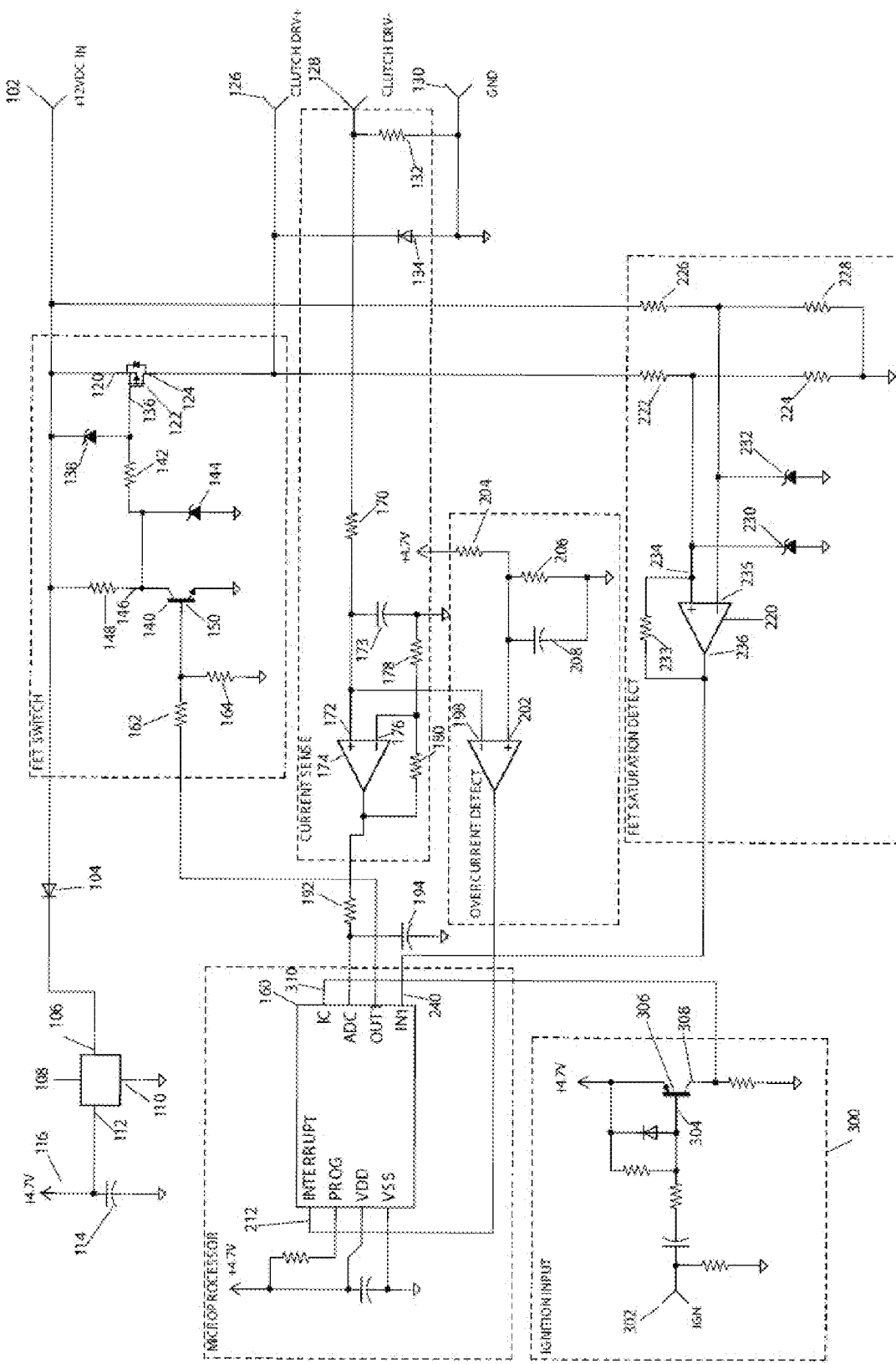

FIGS. 7, 8, and 9 are graphical examples of adaptive pull-in insurance;

FIG. 10 is a graph of prior art pull-in detection failing to detect an indistinct pull-in signature;

FIG. 11 is a graph of the derivative based pull-in detection method showing one sample before pull-in is detected on a distinct pull-in signature;

FIG. 12 is a graph of the derivative based pull-in detection method showing the sample where pull-in is detected on a distinct pull-in signature;

FIG. 13 is a graph of the derivative based pull-in detection method showing one sample before pull-in is detected on an indistinct pull-in signature;

FIG. 14 is a graph of the derivative based pull-in detection method showing the sample where pull-in is detected on an indistinct pull-in signature;

FIGS. 15, 16, and 17 are graphical representations of clutch current versus time showing adaptive pull-in detector threshold in accordance with this invention;

FIG. 18 is a graphical diagram of how the fixed pull-in threshold is determined;

FIG. 19 is a graph of input shaft RPM and current with respect to time for a clutch controller employing active load feedback in accordance with the invention;

FIG. 20 is a flow chart describing period normalization;

FIG. 21 is an example of period normalization;

FIG. 22 is a block diagram of the controller structure for RPM feedback;

FIGS. 23-26 are graphical representations of actual performance of a clutch controller in accordance with the invention;

FIG. 27 is a graph of input shaft load and current with respect to time for a clutch controller employing active load feedback in accordance with the invention;

FIG. 28 is a block diagram of the clutch control system of this invention with load feedback after pull-in is detected;

FIG. 29 is a block diagram of a load feedback arrangement in accordance with this invention with long term BaseRamp;

FIG. 30 is a block diagram of the controller structure for long term base correction for load;

FIG. 31 is a software block diagram of a softstart algorithm for the clutch controller shown in FIG. 6;

FIG. 32 is a software block diagram of a current control PWM algorithm for the clutch controller of FIG. 6. FIG. 33 is a schematic diagram of a clutch controller in accordance with this invention; and FIG. 33 is a schematic diagram of a controller in accordance with the invention.

DETAILED DESCRIPTION OF THE INVENTION

Figure 1:
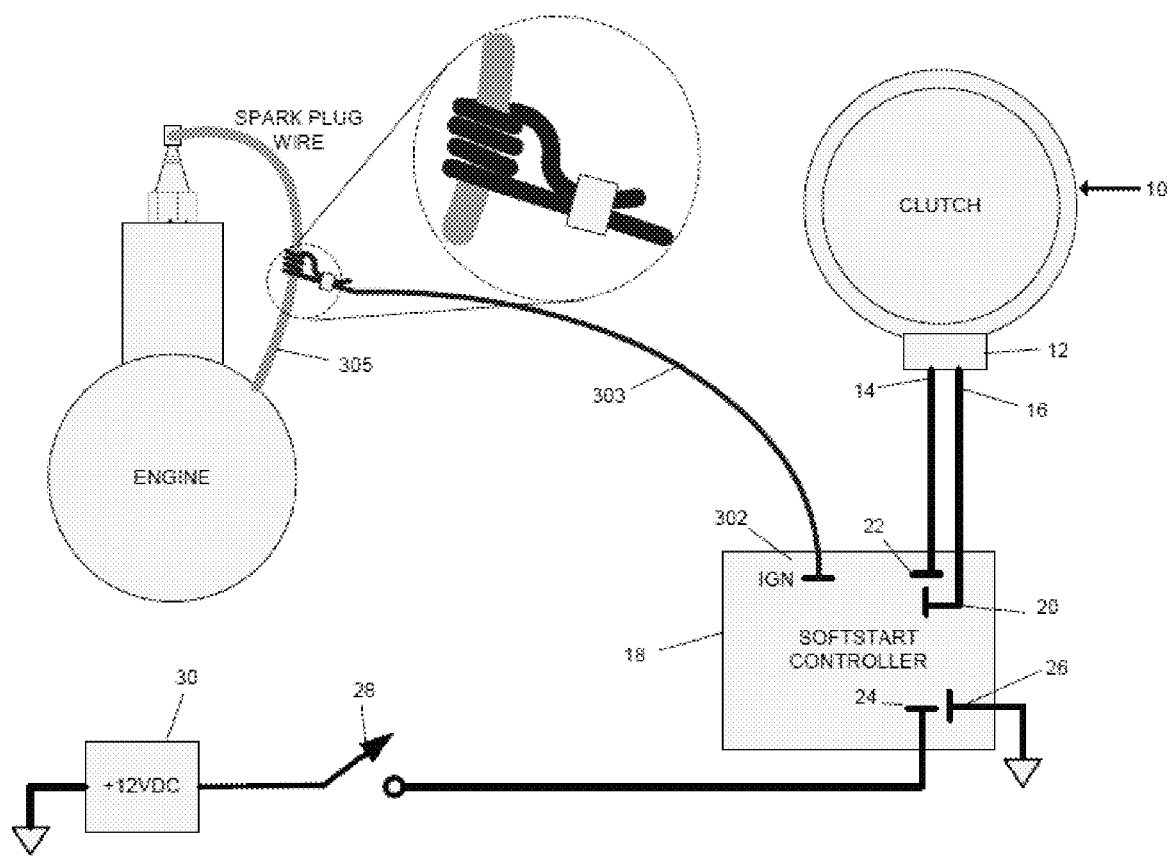
FIG. 1 is a diagrammatic view of an arrangement for actuating an electric clutch utilizing the soft start clutch controller of this invention.

FIG. 1 is a diagrammatic view of a clutch arrangement utilizing a clutch controller in accordance with this invention. A clutch 10 includes an input connector 12 for connecting clutch 10 to soft start clutch controller 18 by way of first and second electrical conductors 14 and 16. Conductors 14 and 16 are connected to output terminals 20 and 22 of clutch controller 18. Clutch controller 18 also includes input terminals 24 and 26. Input terminal 26 is conventionally connected to ground while input terminal 24 is connected to a source of 12 volt DC power such as a battery 30 by way of a power switch 28. When power switch 28 is closed, clutch controller 18 applies power to clutch 10 by way of connector 12 as will be described in more detail below. Input 302 is connected to a an insulated wire that is wrapped around the insulation of a high tension spark plug wire, for example 3 to 4 turns, to capacitively couple pulses from the spark plug wire to the input.

Figure 2A:
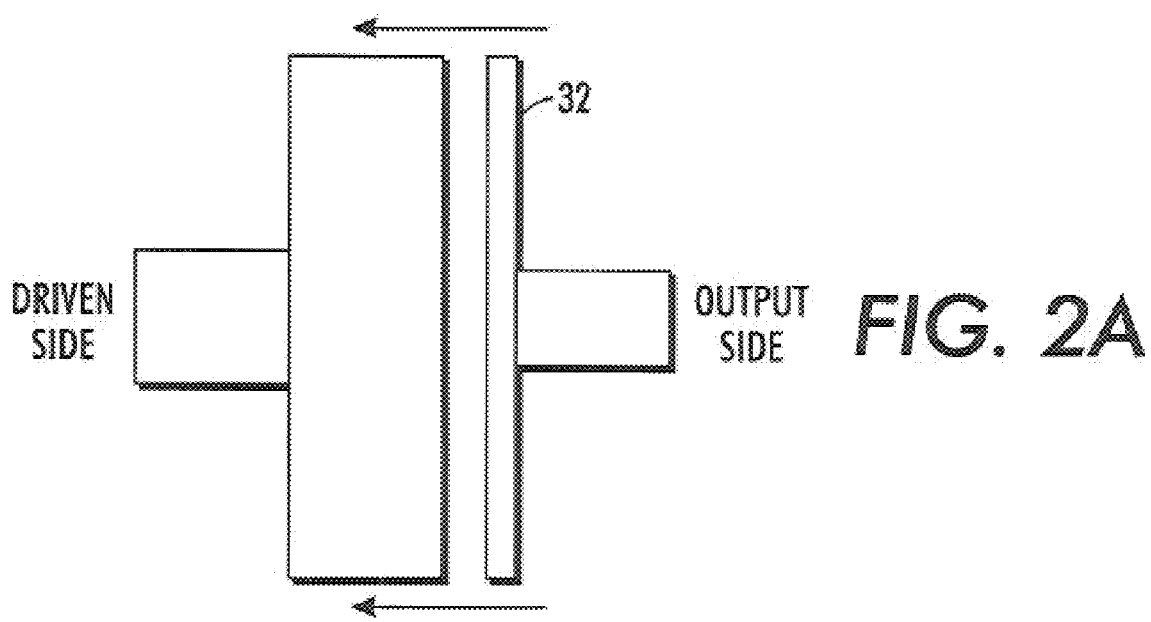
FIGS. 2A and 2B are diagrammatic views of the idealized engagement of a clutch of the type to which the invention relates.
Figure 2B:
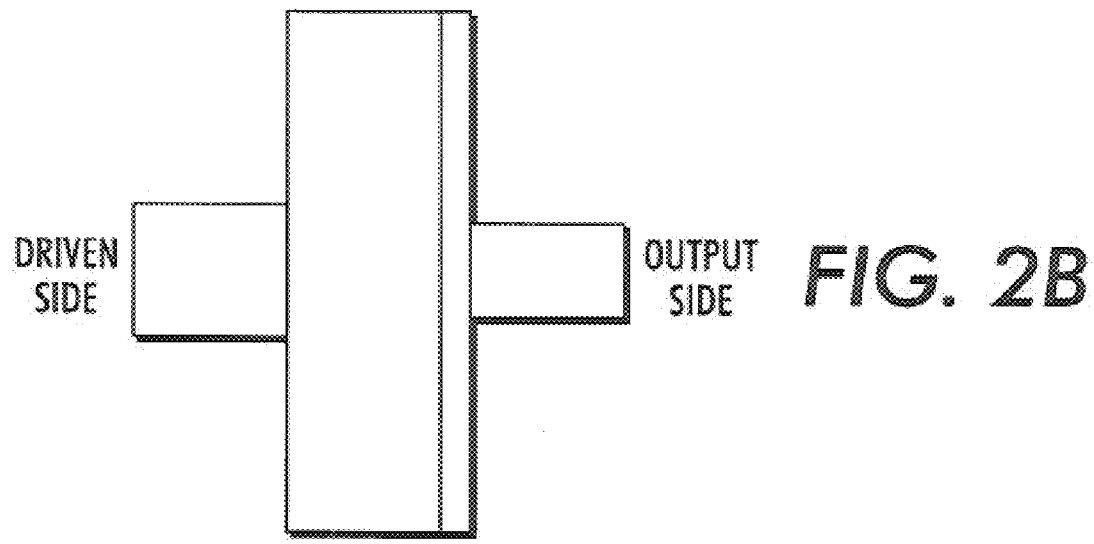
Figure 3A:
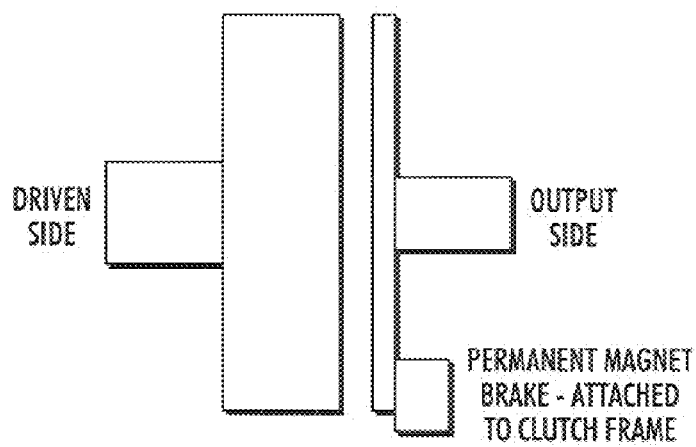
FIGS. 3A through 3C are diagrammatic views of the typical engagement of a clutch of the type to which this invention relates.

FIGS. 2 and 3 are diagrammatic illustrations showing clutch engagement under ideal and typical circumstances. As shown in FIGS. 2(a) and 3(a), when disengaged, the clutch driven side and the clutch output side are spaced apart so that no power is transferred between them and moreover the outside clutch plate is ideally disposed parallel to the driven side clutch plate. As the clutch is drawn in, in an ideal clutch, the output side clutch plate remains parallel to the driven side clutch plate as shown in FIG. 2(b) and engages substantially simultaneously over the entire surface.

Figure 3B:
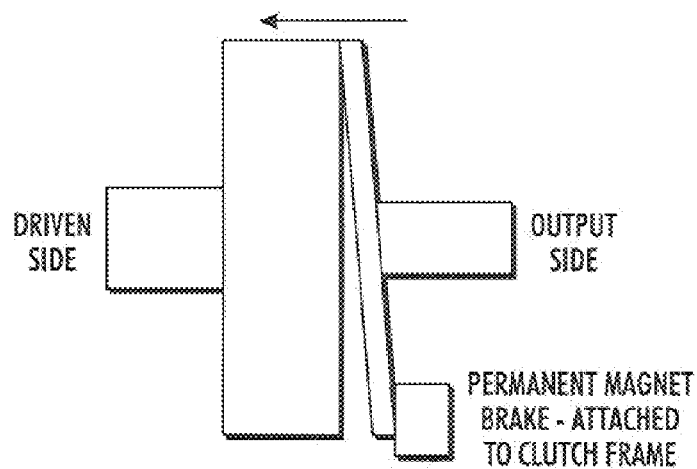
Figure 3C:
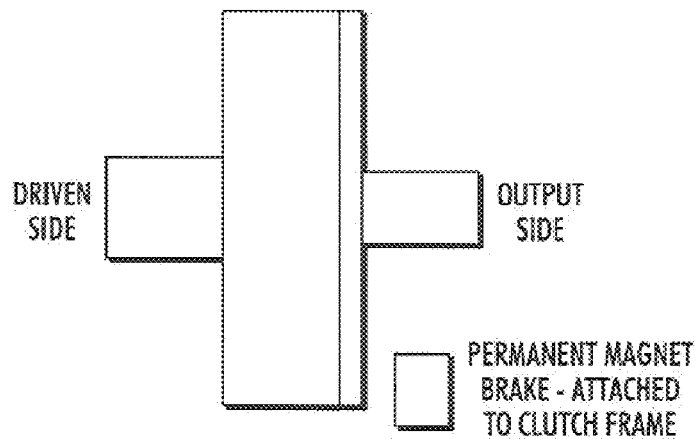

In practice, as shown in FIG. 3, while it is often possible to maintain the driven side and output side clutch plates essentially parallel when the clutch is disengaged, when the clutch is engaged, the output side clutch plate may contact the driven side clutch plate obliquely as shown in FIG. 3(b) and subsequently move into the position shown in FIG. 3(c). As shown in FIGS. 3(b) and 3(c), some clutch manufactures use a permanent magnet brake on the back side of the clutch plate which further exaggerates this problem. This invention allows for this common effect.

FIGS. 4 and 5 are graphical representations of the current applied to a clutch solenoid in accordance with first and second basic open loop embodiments of the invention. Referring to FIG. 4, the current is shown on a vertical axis against time shown on the horizontal axis. When the clutch is engaged, for example when switch 28 as shown in FIG. 1 is closed, the current begins to increase with time at a rate determined primarily by the inductance of the clutch solenoid. As the current increases, the clutch controller monitors the current and elapsed time, calculating the CurrentNormalizationFactor at time t.

Referring to FIG. 4, a graph of current versus time is shown to illustrate the manner in which a controller in accordance with this invention adapts to clutches of various sizes and current ratings. Normalization of the current is used to automatically scale the raw A/D value to ClutchCurrent so that ClutchCurrent is targeted to reach approximately 100% at clutch coil saturation.

After current is applied to a clutch, the current flowing through the clutch is measured after a pre-determined time t and stored as Raw Reference A/D. Raw Reference A/D is used to calculate a normalization factor according to the equation:

$$\text{CurrentNormalizationFactor} = \text{Target}/\text{Raw Reference}A/D$$

Normalization Factor is then used to scale Clutch Current as follows:

$$\text{ClutchCurrent} = \text{CurrentNormalizationFactor} * \text{Raw}A/D$$

The target is a predetermined value, chosen to provide a normalized 100% maximum value of ClutchCurrent for any sized clutch. ClutchCurrent is then used for all clutch control functions. In this example, Target is approximately 20%.

An alternate normalization method is calculated from the saturation current which has been previously measured after the clutch has reached saturation as shown in FIG. 6. This occurs after the soft start portion of the clutch actuation has occurred and the saturation value is stored in non-volatile memory for the next soft start. In this example, Target is 100%.

$$Nv\text{Normalization Factor} = \text{Target}/\text{RawReference}A/D$$

Referring again to FIG. 4, ClutchCurrent continues to build after time t until the controller detects a local maximum where the current begins to decrease. Normally, this maximum occurs just as contact is first made between the driven side and the output side of the clutch which increases the inductance of the coil and reduces the current. When the current through the clutch solenoid decreases to 95% of the MaxPull-in Current, the start of clutch engagement is declared and CurrentSetpoint is set to the Ramp begin value of 20% of the normalized current range.

When the measured ClutchCurrent has decreased to CurrentSetpoint at Ramp begin value, current is again supplied to the clutch solenoid but at a controlled ramp rate to facilitate a smooth engagement of the clutch. Preferably, the controlled rate is a linear ramp but other controlled increases in current are also contemplated as described below. When the end of the ramp is reached, the clutch should be fully engaged. CurrentSetpoint is set to 100% to ensure full engagement and current is applied to the coil at a rate limited only by the coil inductance.

FIG. 5 shows a graph of the current through a clutch solenoid vs. time in accordance with another embodiment of the invention having an additional feature adapted for uneven engagement of the clutch plates as shown in FIG. 3. The wave form of FIG. 5 compensates for partial pull-in which would otherwise be detected as full pull-in, causing the current through the clutch solenoid to be reduced and the clutch to either disengage or, drag along the output disc edge until the ramp current increases to a point where the clutch disc pulls in fully, resulting in a delayed and abrupt engagement.

As shown in FIG. 5, when the maximum current is detected, a set point is established at 95% of the maximum current to detect the beginning of clutch engagement as shown in FIG. 4. When the current falls below 95% of the maximum current, the maximum current is saved as "MaxPull-in Current", a new current set point is established at 1.2 times the MaxPull-in Current and power is continuously applied to the clutch until the new current set point is reached whereupon power to the clutch solenoid is removed and the current begins to decrease with time at a rate again determined primarily by the inductance of the solenoid to a point equal to 20% of the normalized current range. At this point, the current ramp up proceeds as already described in connection with FIG. 4.

This second embodiment allows for the initial reduction of current caused by the sort of uneven initial contact illustrated in FIG. 3(b) by continuing to apply current until a higher threshold is reached thereby providing "pull-in insurance" that actual clutch contact has occurred.

Because of mechanical variations during operation varying degrees of pull-in may occur. Allowing the current to build to 1.2 times MaxPull-in Current after a complete pull-in is unnecessary and may cause a harsh engagement.

When a sharp drop in current occurs, complete pull-in is indicated and little or no additional current build time is needed or desired. A less distinct drop indicates a partial pull-in which requires current to build to a higher level.

To account for variations in pull-in, as shown in FIGS. 7 and 8, an adaptive pull-in insurance threshold (ApiInsuranceThr) replaces the fixed threshold of 1.2 times MaxPull-in Current previously described. ApiInsuranceThr varies based on the difference between the MaxPull-InCurrent and the MinPull-InCurrent recorded after pull-in is detected according to the following formula:

ApiInsuranceThr=MaxPull−InCurrent×PiBuildFactor−PiQualFactor×(MaxPull−InCurrent−MinPull−InCurrent)

To account for changes in MinPull-InCurrent, ApiInsuranceThr is continually recalculated and compared to ClutchCurrent (the measured current). Once ClutchCurrent exceeds ApiInsuranceThr, normal ramping commences.

PiBuildFactor and PiQualFactor are constants. Typical values are:

PiBuildFactor=1.5

PiQualFactor=2

As the clutch nears the end of its life, the current may not reach ApiInsuranceThr before coil saturation is reached. To ensure that the softstart occurs within a reasonable timeframe, a timeout is added according to the following rule:

Allow current to build until current is greater than or equal to ApiInsuranceThr or timeout occurs.

As shown in FIG. 7, for a relatively new clutch with little vibration, the onset of pull-in is distinct and easily recognized. Because of the large difference between MaxPull-InCurrent and Min Pull-in Current, ApiInsuranceThr is set relatively low and ramping begins relatively quickly after the onset of pull-in is detected.

As shown in FIG. 8, when pull-in is less distinct, ApiInsuranceThr is greater, thus allowing more time for current to build before ramping begins.

This allows current to build beyond MaxPull-InCurrent to be certain that pull-in has actually occurred.

As shown in FIG. 9, the combination of extra pull-in time and pull-in insurance timeout due to coil saturation are shown. The pull-in signature is relatively indistinct as in the example shown in FIG. 28, and moreover, coil saturation occurs before the current reaches ApiInsuranceThr. Accordingly, after PI timeout, the ramp phase is initiated automatically.

While the embodiments of the invention described above provide adequate performance in many situations, especially where a distinct drop in current occurs when the clutch armature (clutch disc) pulls in to contact the electromagnet, this distinct current signature, as shown in FIG. 4, occurs reliably only when the armature pulls in squarely towards the electromagnet in one quick fluid motion. In many practical applications, the current signature may be less distinct if the armature pulls in obliquely or if the armature assembly is vibrating as shown in FIG. 10. Vibration of the armature can cause a variation of the inductance as the armature distance varies at the vibration frequency. The change in inductance will cause a resulting modulation of the current waveform. The effect is most pronounced just before the pull-in point as the electromagnet begins to pull the armature closer. Vibration and oblique pull-in may occur together especially in a case where a permanent magnet brake is employed. In this case the edge of the armature opposite the brake magnet typically pulls in first causing a relatively small change in inductance and consequently a small change in current. The disk may then peel off the permanent magnet causing several more small changes in inductance rather than one large distinct change. The Pull-in Threshold may be reduced below 5% to compensate for this but this is generally undesirable because it increases the likelihood of false or premature triggers due to noise or armature vibration alone. As can be seen, the current does not fall below the magnitude required to indicate a pull-in, and consequently, after the clutch is actually pulled in, the current continues to increase uncontrolled to saturation.

FIG. 10 is a graph of current versus time showing these effects. The current increases relatively smoothly from the origin initial current 100 to a first current maximum indicated at 102. Subsequently, as the clutch begins to pull in, clutch vibration causes a series of local minima and maxima 104 of current to occur none of which causes the current to fall below the preselected threshold such as 5% of the maximum current. Consequently, the current is not reduced sufficiently for detection in accordance with the method described above and following the undetected partial pull-in, the current continues to increase to a maximum commencing at time 106.

In accordance with another aspect of this invention, a plurality of current samples is taken but instead of merely storing the highest current value and presuming clutch pull-in when the current falls below that value by a predetermined percentage such as 5%, the rate of change of current with respect to time (di/dt) is calculated from the sample current values. When di/dt falls below the Pull-in Threshold, pull-in is detected and the controller takes over control of the current to begin the soft start ramp period. While the examples described herein use 7 one millisecond samples, both the duration of the samples and the number of samples may vary somewhat. The length of the samples and the number of samples evaluated to determine di/dt are preferably selected to provide a reliable indication of pull-in without overloading the microprocessor that makes the calculations.

FIGS. 11-13 show examples of this technique where Pull-in Threshold is set to one. As shown in FIG. 11, the current is sampled every 1 ms and the magnitude of the current detected during each sample is used to compute a derivative of the current with respect to time over a predetermined number of samples, for example 5 to 20, in this case seven. In the example shown in FIG. 11 the derivative is 6.9 which is above Pull-in Threshold resulting in no pull-in having occurred over this interval.

FIG. 12 shows the same graph as FIG. 11 at the point where pull-in is detected. The one millisecond samples are summed over a subsequent seven millisecond period, but in this case, in the last sample of the new period, the current drops by five and the derivative is plus 0.3. Since this is less than the Pull-in Threshold of 1, pull-in is detected.

FIGS. 13 and 14 show the application of the derivative pull-in detection method to a clutch where a sharp pull-in signature is not present. The figures show the current with respect to time which is the same in each of the two figures. In FIG. 13, the 7 one millisecond samples are summed to produce the derivative di/dt. In this case, the sum is 2.0. With a Pull-in Threshold of 1, pull-in is not detected at this time.

FIG. 14 shows the same window, but one sample later. The derivative di/dt is now 0.6 and with a Pull-in Threshold of 1, pull-in is detected. This demonstrates that the derivative method can be used to detect pull-in in situations such as the one shown in FIG. 10 where the previously described method would not detect pull-in.

As already discussed, pull-in is detected by continuously monitoring the clutch current and noting the characteristic decrease in current when pull-in occurs. A threshold is established to avoid false sensing due to irregularities not indicative of clutch pull-in. A problem with known clutch controllers is that a fixed Pull-in Threshold does not account for clutch wear and may result in the failure to detect pull-in of a worn clutch.

FIG. 15 is a graph of current versus time for a new clutch showing early pull-in. FIG. 17 is a graph of current versus time for a worn clutch showing late pull-in. As can be seen, the rate of change of current with respect to time at pull-in for a new clutch is much higher than the rate of change of current with respect to time for a worn clutch. A single Pull-in Threshold cannot accurately detect pull-in in both of these situations.

In accordance with this invention, the Pull-in Threshold must be changed as the point on the current versus time graph at which pull-in occurs changes.

In accordance with this invention, as shown in FIG. 16, a synthesized current waveform is generated to approximate the actual current through a clutch coil inductor over time. The synthesized current does not simulate the reduction in current produced by pull-in, so that it is essentially a calculated curve based upon the inductance the solenoid, the applied voltage, and other factors. The synthesized current waveform can be stored as an equation or a look-up table for faster response. The synthesized current waveform is adjusted to be at the same scale as the clutch current so that at saturation, the synthesized current equals the clutch current.

In accordance with the invention, as shown in FIG. 18, a fixed threshold is set to one half the expected drop in current produced by a typical pull-in. That is, if the drop in current during pull-in is expected to be 4, the fixed threshold is set to 2. The Pull-in Threshold is then set equal to the synthesized change in current minus the fixed threshold. The synthesized change in current is the change in current versus time for a predetermined time period, in this example 15 milliseconds. Referring to FIG. 15, it can be seen that for a new clutch, pull-in occurs at a relatively low current, whereas, as shown in FIG. 17, for a worn clutch, pull-in occurs at a higher current. The synthesized change in current at the low current pull-in point is 10, while the synthesized change in current at the high current pull-in point is 2. The value for the fixed threshold is set to 2, one-half the expected drop of 4. Applying these numbers to the formula, for a new clutch the change over 15 milliseconds immediately preceding the time of pull-in is 10. Subtracting 2 yields 8. For a worn clutch, the change in current over 15 milliseconds just prior to the time of pull-in is 2, and the Pull-in Threshold is therefore 0.

Up to this point all of the elements of the basic softstart controller operating in an open loop mode have been described. In accordance with another aspect of this invention, the invention relates to a method of controlling the solenoid current during the period at which the current is supplied to the solenoid at a controlled rate. Referring to FIG. 19, the initiation of a pull-in is detected in one of the ways already described, that is by noting a drop in the absolute current flowing through the solenoid or by comparing the rate of change of the current to a pre-determined value. Once the commencement of a pull-in has been detected, the current to the solenoid is reduced to begin commencement of the controlled engagement ramp period. Subsequently, BaseRamp current is increased during the controlled engagement period. Simultaneously, the ActualRPM of the input shaft is compared to a DesiredRPM profile and an Error signal is generated. The Error equals the ActualRPM minus the DesiredRPM times the configuration gain, an amount determined in advance. The current is adjusted by adding the Error determined from the ActualRPM to the base current. In this way, by adjusting the current, the error between the ActualRPM and the DesiredRPM is minimized.

Once the actual current has increased to a pre-selected level, complete clutch engagement is presumed and the current is thereafter permitted to increase at a rate limited by the coil inductance as has already been discussed.

RPM droop is an approximation of engine load and as such the DesiredRPM profile may be selected to provide a number of different levels of soft engagement. One method is to decrease the RPM linearly from about 95% of the ReferenceRPM at the beginning of clutch engagement to about 60% of the ReferenceRPM at full engagement. Note that the 95% RPM beginning point is chosen to account for the approximate initial RPM drop that occurs while the clutch coil current is decaying during the period between when pull-in occurs and when the ramp up begins.

A method for controlling clutch engagement in accordance with this invention may be summarized as follows. All references are to FIG. 19.

Immediately after power up, CurrentSetpoint is set to 100% duty cycle to apply maximum DC power to the armature coil.

At time t CurrentNormalizationFactor is calculated as described previously.

Immediately before engagement commencement, the ReferenceRPM is captured. Preferably, the RPM is captured right before pull-in is detected.

While it is possible to measure RPM directly, it may be more convenient to measure the period of a signal related to RPM such as the period between spark pulses. This period can be used directly or converted to RPM according to the formula RPM=60/period.

Where period is the time in seconds between pulses.

In accordance with one aspect of the invention the ReferenceRPM or reference period is normalized to a constant at the time of measurement. This has two advantages. Without normalization, the loop gain of the control loop will vary as the RPM changes. For example, a 10% error at 2000 RPM is 200 RPM while a 10% error at 4000 RPM is 400 RPM. Normalization makes these two the same. Normalization also permits the software to operate independently of system configuration differences such as the number of spark pulses per revolution or the actual engine speed. This allows the controller to be used for example on two and four cycle engines as well as on engines operating at different normal speeds, without modification. FIG. 20 is a block diagram of an exemplary method for determining the normalized period from a measured period and a predetermined reference period.

Normalization has a second advantage. The period is often measured as a 16-bit number. When an 8-bit microprocessor is used to keep costs low, processing 16 bit numbers is computationally inefficient. By normalizing the period, the 16-bit number may be converted to an 8-bit number without substantially affecting the dynamic range of the measurement.

FIG. 21 provides an example of period normalization. Immediately after beginning, pull-in is tested. If pull-in has not occurred, the process loops back until pull-in is detected. Once pull-in is detected, the reference period is set to a stored value, in this case 20,000 us and the normalization factor is set equal to 20,000 divided by 100, yielding a normalization factor of 200 in this case. The normalized period is then continuously recalculated until the ramp has been completed and the routine exits.

Pull-in is then detected using either the derivative method or the fixed current drop method described above.

Once the initiation of pull-in has been detected, the BaseRamp current profile is generated as described previously. The BaseRamp profile is typically chosen for optimum open loop soft start performance. Simultaneously, the DesiredRPM profile is generated.

DesiredRPM profile is the desired engine droop rate for a normal engagement based on a percentage of the ReferenceRPM. This profile may be linear or non-linear over time and is based on a percentage of the ReferenceRPM captured in Step 3.

In the example shown in FIG. 19, the start of the DesiredRPM Profile is 95% of the ReferenceRPM, and the end of the DesiredRPM Profile is 60% of the ReferenceRPM.

The ActualRPM is then continuously compared to the DesiredRPM profile and an error signal is generated. The error is the difference between the ActualRPM and the DesiredRPM. The error is scaled by the configuration gain constant selected for optimum loop stability.

Error is the difference between the DesiredRPM Profile and the ActualRPM at any given time scaled by the ConfigGain. AdjustedRamp is the BaseRamp plus the error, and therefore is the actual CurrentSetpoint that is applied to the clutch coil.

Adding Error to BaseRamp will vary the coupling of the load to the engine with the goal of fitting engine RPM as closely as possible to the DesiredRPM profile.

For clarity of explanation, the method just described used a simple proportional controller. FIG. 22 shows a block diagram of the controller for this embodiment. In FIG. 22 the Error term is fed into a ControlSystem block where it is conditioned before being added to BaseRamp. There are many different control system topologies that will prove effective, but a PID controller will provide good results.

Figure 23:
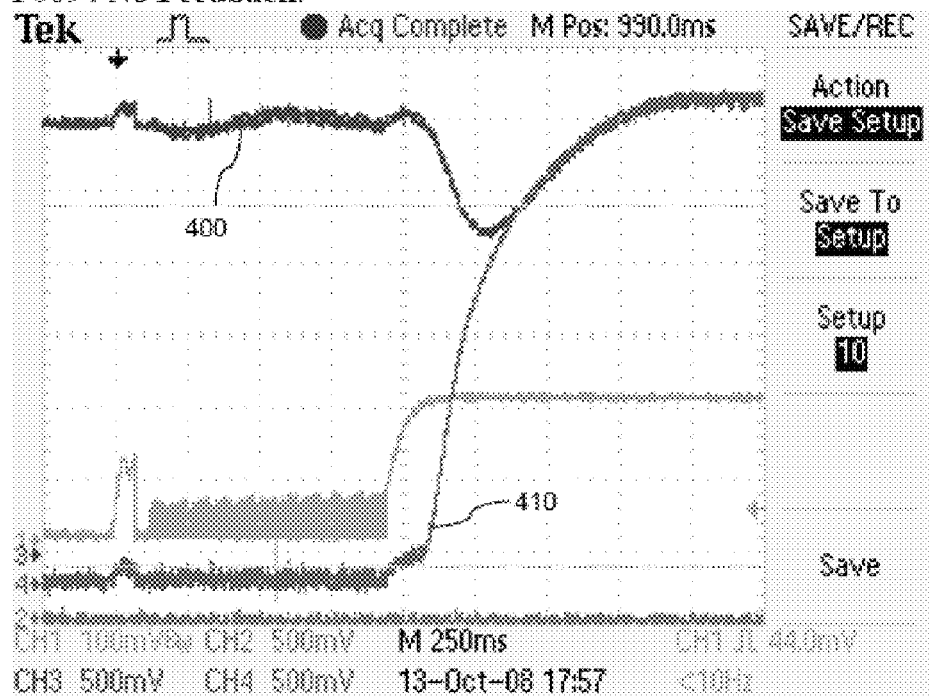
Figure 24:
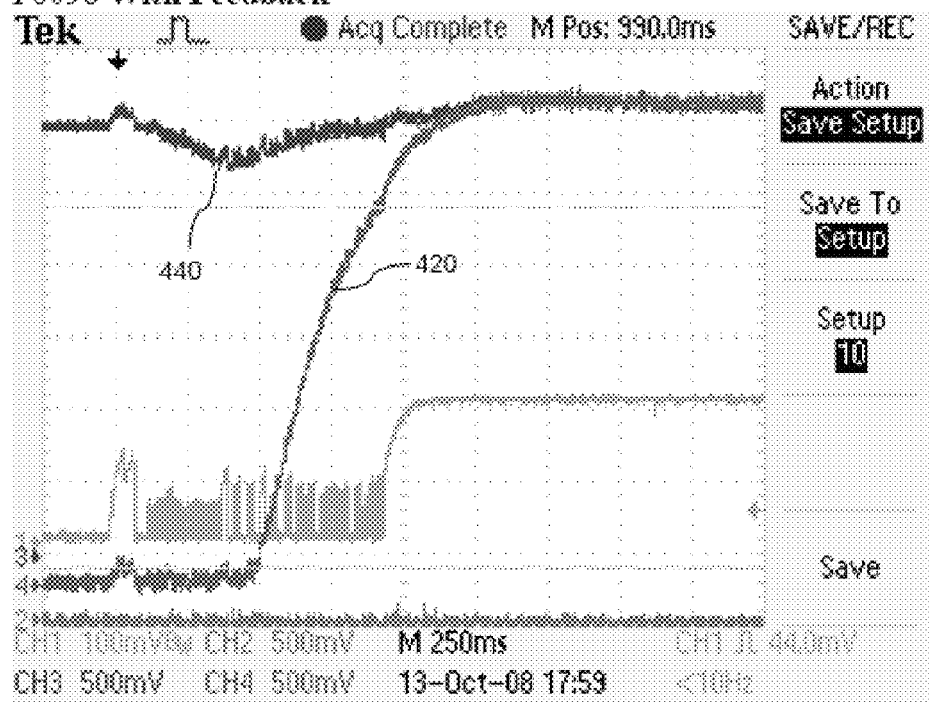

The efficacy of the soft start clutch and the method described herein may be more readily appreciated by a reference to the results of tests made on the clutch, which results are shown in FIGS. 23 and 24. FIG. 23 shows the results of a first test in which the ramp current was set for a very soft engagement with the ramp starting at 80 and ending at 110. No feedback was employed.

The engine RPM is shown by trace 400 and the output shaft RPM is shown by trace 410. As can be seen, although the output shaft RPM increases gradually, the engine shaft RPM shows a significant dip at the end of the ramp, illustrating excessive slippage throughout the ramping period.

In FIG. 24, feedback in accordance with this invention is employed and the output shaft RPM shown by trace 420 increases smoothly while there is a significantly reduced dip in the engine shaft RPM 440, thus indicating a soft engagement.

Figure 25:
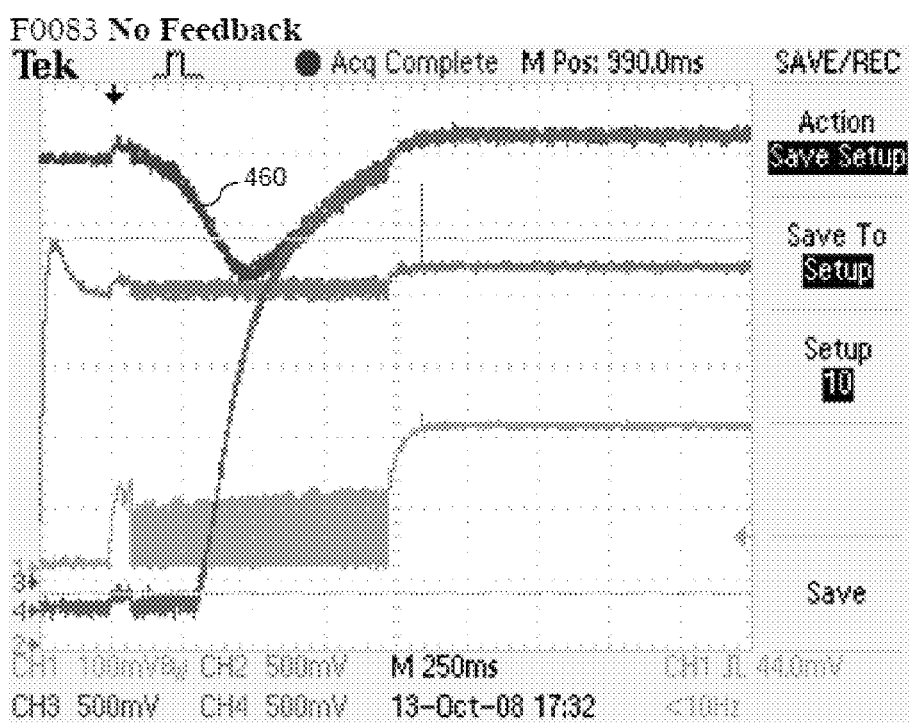
Figure 26:
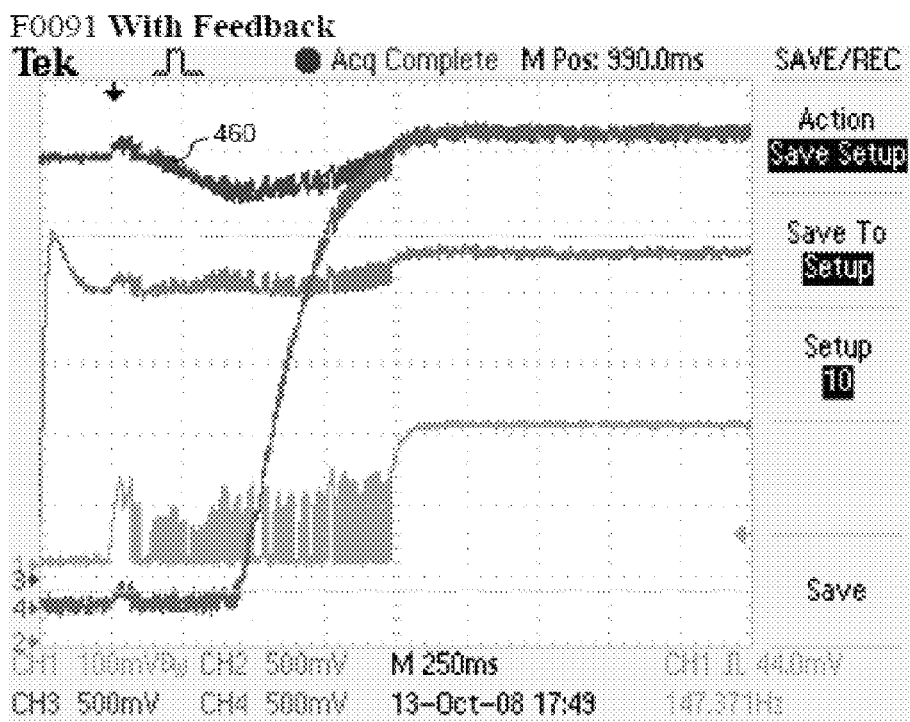

The results of a second test are illustrated at FIGS. 25 and 20. In this case, the ramp was set for a harsh engagement, the ramp starting at 150 and ending at 200. In FIG. 19, no feedback is employed and a very sharp dip in engine shaft RPM is observed at the time of clutch engagement. In FIG. 26, with feedback in accordance with this invention, the dip in engine shaft RPM is significantly reduced, thus indicating a soft start in accordance with the invention.

In the previous example RPM droop was used as a simple approximation of engine load. More direct measurements of load can of course be used. For example, the current and voltage supplied to an electric motor may be measured as ActualLoad and applied to the control system shown in FIG. 28.

FIG. 27 graphically illustrates a general example of load feedback.

Immediately after power up, CurrentSetpoint is set to 100% duty cycle to apply maximum DC power to the armature coil.

At time t CurrentNormalizationFactor is calculated as described previously.

Pull-in is then detected using either the derivative method or the current draw method described above.

Once the initiation of pull-in has been detected, the BaseRamp current profile is generated as described previously. Simultaneously, the DesiredLoad profile is generated.

The DesiredLoad profile is the desired motor load rate for a normal engagement based either on predetermined values or as a percentage of ReferenceLoad which had been captured and stored from previous soft starts. This profile may be linear or non-linear over time.

In the example shown in FIG. 19, the start of the DesiredRPM Profile is offset above zero to account for initial uncontrolled loading that occurs when the solenoid current is decaying between the time that pull-in occurs and the time that the ramp begins.

Error is the difference between the DesiredLoad Profile and the ActualLoad at any given time scaled by the Config- Gain. AdjustedRamp is the BaseRamp plus the error, and therefore is the actual CurrentSetpoint that is applied to the clutch coil.

For clarity of explanation, the method just described used a simple proportional controller. FIG. 28 shows a block diagram of the controller for this embodiment.

Referring now to FIG. 29, an arrangement similar to FIG. 28 is illustrated with long term feedback added. The elements of FIG. 29 that are the same as in FIG. 28 are identified with the same reference numbers. As can be seen, the error at the beginning and ending of the ramp is sampled by closing switches 61, 63, and 65 and integrating the error over time. Any number of multiple switches and integrators may be added as represented by the dotted line example at t=x. The integrated error is then applied to the BaseRamp for subsequent starts so that the error is minimized. BaseRamp is used as described previously, in FIGS. 28 and 30.

FIG. 30 shows a controller example which uses long term feedback exclusively. It is essentially the same as the controller described in FIG. 29 with real time feedback removed. As can be seen, the error at the beginning and ending of the ramp is sampled by closing switches 61, 63, and 65 and integrating the error over time. Any number of multiple switches and integrators may be added as represented by the dotted line example at t=x. The integrated error is then applied to the BaseRamp for subsequent starts so that the error is minimized.

In accordance with another embodiment, the current normalization may be eliminated altogether and replaced by a conventional factory calibration of the ClutchCurrent.

FIG. 31 is a flowchart showing how the basic software in microcontroller 160 operates to implement the invention. On boot up, either upon the initial application of power or upon the system being reset, an initialization routine as shown at 40 is performed. The current set point is set to zero while a delay period at 42 elapses to wait for the system to stabilize.

The CurrentSetpoint is initialized to 100% at 44, and clutch coil current begins to build limited only by its L/R time constant. At time t shown by 46, the software captures a RawA/D sample to be used in the CurrentNormalizationFactor calculation at 48.

At 50, the controller software loops at a 1 ms rate while repeatedly calculating Derivative and updating SynthesizedCurrent. Derivative is then compared it to the Pull-in Threshold which is derived from SynthesizedCurrent.

At 52, immediately after pull-in is detected ReferencePeriod is captured where it is used in the PeriodNormalizationFactor calculation at 53.

ClutchCurrent continues to build while it is compared against ApiInsuranceThreshold in 54.

When ClutchCurrent exceeds ApiInsuranceThreshold at 56, the first BaseCurrent point is generated. At essentially the same time the first DesiredRPM point is generated at 58. At 60 Error is calculated by Subtracting DesiredRPM from ActualRPM. A new CurrentSetpoint is produced at 61. If End of Ramp has not occurred at 62, the process is repeated where the next ramp points are generated and a new Error calculation is made.

At 63 CurrentSetpoint is set to 100% to ensure that the clutch is fully engaged.

FIG. 32 is a software block diagram showing the manner in which the controller shown in FIG. 6 controls the current through the clutch solenoid. The current is sampled by measuring a voltage across resistor 132 at a rate of 50 kHz. The analog to digital conversion occurs within controller 160. The current is averaged every 50 samples, that is approximately 1,000 times per second, in block 66 and the average current is compared to the CurrentSetpoint minus hysteresis in block 68. If the current is below the CurrentSetpoint FET 123 is turned on in block 70 and the saturation detector 220 is tested in block 72. If the current is higher than the saturation current and the over current timeout has expired as tested at block 74 then the FET is latched off in block 76. As long as the saturation current is not exceeded or is exceeded only for a short time the routine terminates in block 78.

Returning to block 68, if the current is greater than the CurrentSetpoint minus hysteresis and continues to increase until it is greater than the CurrentSetpoint as tested in block 80, the FET is turned off in block 82, the over current timeout is reset in block 84 and the routine terminates in block 78. If the current is not greater than the CurrentSetpoint as tested in block 80 then the routine terminates at block 78.

FIG. 33 is a schematic diagram of a clutch controller in accordance with another embodiment of the invention. A power source such as a 12 V DC power source is connected to an input terminal 102. Terminal 102 is connected by way of a diode 104 to an input terminal 106 of a voltage regulator 108. Regulator 108 has a ground terminal 110 and an output terminal 112 that provides an operating voltage for example 4.7 V to the other elements of the clutch controller as will be discussed in more detail below. A filter capacitor 114 filters the output of voltage regulator 108 and the filtered output is available on terminal 116.

Input terminal 102 is also connected to the source terminal 120 of field effect transistor 122. Drain 124 of FET 122 is connected to a first clutch solenoid terminal 126. The other end of the clutch solenoid is connected to terminal 128 which is connected to ground through low resistance resistor 132 which may have resistance of approximately 0.1 ohm. Resistor 132 is connected in such a way that both the ON and OFF current through the clutch solenoid may be measured by sensing the voltage drop across resistor 132. Ground is connected to output terminal 130. A snubber diode 134 is connected between terminal 126 and ground to provide a path for the clutch solenoid recirculating current during the PWM off period.

Gate electrode 136 of FET 124 is clamped to a maximum gate-source voltage of approximately 10V by zener diode 138. Gate terminal 136 is connected to the collector of gate drive transistor 140 by current limiting resistor 142 which may have a value of approximately 390 ohms. A zener diode, preferably a 20 V zener diode 144 is connected between the collector and the emitter of transistor 140 to limit the voltage applied to transistor 140 during a "load-dump" transient. Load-dump transients can occur when the 12V battery is suddenly disconnected from a running engine's charging system. Zener diode 144 also forces FET 122 ON during the load dump, both to keep FET 122's drain-source voltage within safe limits and to help to suppress the load-dump by providing a load via the clutch. Collector 146 of transistor 140 is connected to the 12 volt source through resistor 148 which is preferably a 1.5 K. ohm resistor. Base 150 of transistor 140 is connected to an output of microcontroller 160 by a series resistor 162. Base resistor 164 is connected between the base 150 and ground and preferably has a value of approximately 2 K. ohms The current through the clutch solenoid coil is sensed as a voltage drop across resistor 132 which is connected through a filter comprising a series resistor 170 and a capacitor 173 to a non-inverting input 172 of a comparator 174. Preferably, resistor 170 has a value of approximately 2 K. ohms. An inverting input 176 of comparator 174 is connected to ground through a series resistor 178 which preferably has a value of about 1000 ohms. A feedback resistor 180 is connected between output 182 of comparator 174 and inverting input 176. The output of comparator 174 is connected to an input 190 of controller 160 through a filter comprising a series resistor 192 which preferably has a value of approximately 2 K. ohms and a capacitor 194 which preferably has a value of 0.01 μF.

The filtered current signal is also connected to the inverting input 198 of a comparator 200 whose non-inverting input 202 is connected to a voltage divider comprising a first resistor 204 which preferably has a value of approximately 20 K. ohms and a second resistor 206 which preferably has a value of approximately 10 K. ohms. A filter capacitor 208 is connected in parallel with resistor 206. Comparator 200 provides a signal at output 210 when the current through the clutch solenoid exceeds a predetermined value set by the ratio of resistors 204 and 206. The current overload signal is applied to input 212 of controller 160 which is preferably an interrupt input.

The clutch controller uses a high side driver with the FET 122 switching the voltage provided to the clutch at terminal 126 and senses the current in the return path at terminal 128. In the case of an external short circuit to ground, the return path is bypassed. In this case the FET 122 could see a dangerously high current while the sense circuit measured zero current.

The FET drain-source saturation voltage is dependent on the current and the FET $R_{DSON}$ of 0.06 ohms. If the current is normal (<5 A), the FET will saturate to less than 0.3V across its drain-source. As the current increases the saturation voltage increases. Therefore, by monitoring the saturation voltage the approximate current through the FET can be sensed to provide short circuit protection.

A saturation detector comparator 220 has a non-inverting input 234 connected to a first voltage divider comprising resistors 222 and 224 connected between the FET drain terminal 124 and ground, and a second inverting input 235 connected to a second voltage divider comprising resistors to 226 and 228 connected between FET source terminal 120 and ground. Zener diodes 230 and 232 limit the voltage is produced by the two voltage dividers to safe values but do not otherwise affect the comparison. Preferably, resistor 222 has a value of approximately 75 K. ohms, resistor 224 has a value of approximately 10 K. ohms, resistor 226 has a value of approximately 100 K. ohms, and resistor 228 has a value of approximately 10 K. ohms.

Comparator 220 preferably has a feedback resistor 233 which may have a value of 1 meg. ohm connected between its noninverting input 234 and its output 236 to provide a degree of hysteresis for the saturation detector. Output 236 of saturation detector 220 is connected to an input 240 of microcontroller 160.

Neglecting hysteresis resistor 232, the resistor ratios are set up for a comparator transition with the FET source 120 at 12V and the drain 124 at 9.27V. Therefore, if the drain is above 9.27V the comparator output 220 is high, below 9.27 it is low. This gives a drain-source maximum of 2.73V—this threshold was set high to ensure that there would be no false trips. It could be reduced significantly to reduce maximum short circuit current.

A sensor 300 is coupled to the ignition circuit of the engine being controlled and to microprocessor 160 for measuring the RPM of the engine. As shown in FIG. 1, input 302 is connected to a an insulated wire that is wrapped around the insulation of a high tension spark plug wire, for example 3 to 4 turns, to couple pulses from the spark plug wire to the input 302 of the sensor. Input 302 is capacitively coupled to the base 304 of transistor 306. The negative going portion of the coupled spark signal turns on transistor 306 and produces a positive going edge at collector 308 which is coupled to the timer input 310 of microcomputer 160. The microcomputer preferably includes an interrupt routine for measuring the period between positive edges of the pulses coupled to the microcomputer for determining the RPM of the engine.

While the invention has been described in connection with certain presently preferred embodiments thereof, those skilled in the art will recognize that many modifications and changes may be made therein without departing from the true spirit and scope of the invention which accordingly is intended to be defined solely by the appended claims.

The invention claimed is:

1. A controller for operating a range of electrically operated solenoid actuated clutches requiring different operating current comprising:
    a controllable power source coupled to the solenoid;
    a current sensor coupled to the solenoid, responsive to the current flowing in the solenoid and producing an output signal proportional to said current; a controller having a memory and coupled to the power source and the current sensor and responsive to the output signal for calculating a normalization factor based on the output signal and storing the normalization factor in the memory, increasing the current at a first rate, reducing the current to a second preselected current determined with reference to the normalization factor, increasing the current to a third preselected current based on the normalization factor at a second rate lower than the first rate, and then increasing the current at the first rate.

2. A controller for operating an electrically operated solenoid actuated clutch to provide controlled engagement comprising:
    a controllable power source coupled to a clutch solenoid;
    a current sensor coupled to the solenoid, responsive to the current flowing in the solenoid and producing an output signal proportional to said current,
    a controller coupled to the power source and the current sensor for increasing the current at a first rate until the onset of pull-in, reducing the current and then, increasing the current at a second rate lower than the first rate, and then increasing the current at the first rate.

3. The controller of claim 2 in which the onset of pull-in is determined by reference to a plurality of discrete samples.

4. The controller of claim 2 in which the onset of pull-in is detected by comparing the rate of change of current with respect to time to a predetermined threshold.

5. The controller of claim 2 in which the onset of pull-in is determined by reference to a time out function.

6. The controller of claim 2 in which the rate of change of current with respect to time is compared to a predetermined current threshold.

7. The controller of claim 6 in which onset of pull-in is detected by generating a predetermined current waveform and comparing the actual current to the predetermined current waveform.

8. The controller of claim 7 in which the predetermined current waveform is generated by reference to the stored output signal.

9. A method for smoothly engaging a solenoid actuated electromechanical clutch comprising:
    applying current to the solenoid;
    detecting the onset of pull-in reducing the amount of current supplied to the solenoid;
    monitoring the load on the clutch;

applying current to the solenoid in response to the monitored load to maintain a predetermined monitored load profile.

10. The method for smoothly engaging a solenoid actuated electromechanical clutch of claim 9 in which monitoring the load comprises monitoring the rotational speed of the clutch.

11. The method for smoothly engaging a solenoid actuated electromechanical clutch of claim 9 comprising the further step of normalizing the rotational speed.

12. A method for smoothly engaging a solenoid actuated electromechanical clutch comprising:
applying current to the solenoid;
detecting the onset of pull-in reducing the amount of current supplied to the solenoid;
measuring the speed of the clutch by sensing the period of a spark signal applied to an engine coupled to the clutch; and
applying current to the solenoid to maintain a predetermined speed profile as determined by the measured speed.

13. A method for smoothly engaging a solenoid actuated electromechanical clutch comprising:
applying current to the solenoid;
detecting the onset of pull-in reducing the amount of current supplied to the solenoid;
monitoring the load on the clutch;
applying current to the solenoid to maintain a predetermined load profile as determined by the monitored load by generating a predetermined speed profile measuring the difference between the predetermined speed profile and the actual speed profile and modifying a subsequent predetermined current profile based on the measured difference for a previous actuation.

14. The method for smoothly engaging a solenoid actuated electromechanical clutch of claim 13 comprising modifying the predetermined current profile based on the differences for a plurality of prior actuations.

15. A method for smoothly engaging a solenoid actuated electromechanical clutch comprising:
applying current to the solenoid at a first rate;
detecting the onset of pull-in;
allowing a predetermined time to pass and then momentarily interrupting the flow of current to the solenoid; and
supplying current to the solenoid at a rate lower than the first rate.

16. A method for smoothly engaging a solenoid actuated electromechanical clutch comprising:
applying current to the solenoid at a first rate;
monitoring the current flowing through the solenoid;
detecting the onset of pull-in by first detecting a local decrease and then detecting a further increase in current beyond the local decrease;
allowing a predetermined time to pass and then momentarily interrupting the flow of current to the solenoid;
supplying current to the solenoid at a rate lower than the first rate.

17. A method for smoothly engaging a solenoid actuated electromechanical clutch having a solenoid and a solenoid core comprising:
supplying current to the solenoid at a first rate;
detecting the onset of pull-in by waiting a time after the initiation of pull-in determined by the amount of decrease in clutch current immediately following the initiation of pull-in to allow the current to build to avoid responding to a false pull-in; and
in response to the detecting, reducing the current supplied to the solenoid to a rate that causes a gradual engagement of the clutch.

18. A method for smoothly engaging a solenoid actuated electromechanical clutch having a solenoid and a solenoid core comprising:
supplying current to the solenoid at a first rate;
detecting the onset of pull-in;
detecting the onset of pull-in allowing the current to build to a threshold determined by the amount of decrease in clutch current immediately following the initiation of pull-in to allow the current to build to avoid responding to a false pull-in; and
in response to the detecting, reducing the current supplied to the solenoid to a rate that causes a gradual engagement of the clutch.

19. The method of claim 17, in which detecting the onset of pull-in is determined with reference to the rate of change of current with respect to time.

* * * * *

UNITED STATES PATENT AND TRADEMARK OFFICE
CERTIFICATE OF CORRECTION

PATENT NO.        : 8,320,096 B2                                              Page 1 of 1
APPLICATION NO.   : 12/580929
DATED             : November 27, 2012
INVENTOR(S)       : Sean Harnett It is certified that error appears in the above-identified patent and that said Letters Patent is hereby corrected as shown below:

In Col. 12, lines 30-31, "FIGS. 25 and 20" should read -- FIGS. 25 and 26. --

In Col. 14, lines 60-67 - Col. 15, lines 1-6: Please delete the entire paragraph and replace it with -- The current through the clutch solenoid coil is sensed as a voltage drop across resistor 132 which is connected through a filter comprising a series resistor 170 and a capacitor 173 to a non-inverting input 172 of a op-amp 174. Preferably, resistor 170 has a value of approximately 2 K. ohms. An inverting input 176 of op-amp 174 is connected to ground through a series resistor 178 which preferably has a value of about 1000 ohms. A feedback resistor 180 is connected between output 182 of op-amp 174 and inverting input 176. The output of op-amp 174 is connected to an input 190 of controller 160 through a filter comprising a series resistor 192 which preferably has a value of approximately 2 K. ohms and a capacitor 194 which preferably has a value of 0.01 µF. --

Signed and Sealed this
Ninth Day of April, 2013

Teresa Stanek Rea
*Acting Director of the United States Patent and Trademark Office*